United States Patent
Harada et al.

(10) Patent No.: US 11,292,883 B2
(45) Date of Patent: Apr. 5, 2022

(54) PREPREG, PREPREG LAMINATE, AND FIBER-REINFORCED COMPOSITE MATERIAL

(71) Applicant: MITSUBISHI CHEMICAL CORPORATION, Tokyo (JP)

(72) Inventors: Yukihiro Harada, Tokyo (JP); Atsushi Nohara, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 99 days.

(21) Appl. No.: 16/372,805

(22) Filed: Apr. 2, 2019

(65) Prior Publication Data

US 2019/0225764 A1    Jul. 25, 2019

Related U.S. Application Data

(63) Continuation of application No. PCT/JP2017/036139, filed on Oct. 4, 2017.

(30) Foreign Application Priority Data

Oct. 4, 2016    (JP) .............................. JP2016-196691

(51) Int. Cl.
*C08J 5/24*    (2006.01)
*B32B 5/26*    (2006.01)
(Continued)

(52) U.S. Cl.
CPC ................... *C08J 5/24* (2013.01); *B32B 5/26* (2013.01); *C08G 59/26* (2013.01);
(Continued)

(58) Field of Classification Search
CPC ...... C08J 5/24; C08J 2463/00; C08J 2477/00; C08J 2363/00; C08G 59/4021; B32B 5/26;
(Continued)

(56) References Cited

U.S. PATENT DOCUMENTS

| 5,028,478 A | 7/1991 | Odagiri et al. |
| 5,789,073 A | 8/1998 | Odagiri et al. |

(Continued)

FOREIGN PATENT DOCUMENTS

| CN | 102348735 A | 2/2012 |
| CN | 103270109 A | 8/2013 |

(Continued)

OTHER PUBLICATIONS

MatWeb Material Property Data, "Evonik Trogamid(R) CX7323 Transparent Nylon" online, Oct. 21, 2020, http://www.matweb.com/search/datasheet.aspx?matguid=cc26b974f7e94d889a9f59f309d0888f&ckck=1 (Year: 2020).*

(Continued)

*Primary Examiner* — Callie E Shosho
*Assistant Examiner* — Bethany M Miller
(74) *Attorney, Agent, or Firm* — Morgan, Lewis & Bockius LLP

(57) ABSTRACT

A prepreg comprising the following constituent elements (A), (B), and (C), the constituent element (C) being present in a surface layer of the prepreg: Constituent element (A): a reinforcing fiber base material; Constituent element (B): an epoxy resin composition containing a curing agent, the epoxy resin composition being cured within the range of from 90° C. to 140° C. (inclusive); and Constituent element (C): particles of a thermoplastic resin having a melting point or a glass transition temperature within the range of from 90° C. to 140° C. (inclusive).

11 Claims, 2 Drawing Sheets

(51) Int. Cl.
*C08L 63/00* (2006.01)
*C08G 59/40* (2006.01)
*C08G 59/26* (2006.01)

(52) U.S. Cl.
CPC .......... *C08G 59/4021* (2013.01); *C08L 63/00* (2013.01); *B32B 2260/046* (2013.01); *C08J 2363/00* (2013.01); *C08J 2463/00* (2013.01); *C08J 2477/00* (2013.01); *C08L 2205/025* (2013.01); *C08L 2205/035* (2013.01)

(58) Field of Classification Search
CPC .............. B32B 29/02; B32B 2262/106; B32B 2262/0269; B32B 2262/10; B32B 2260/023; B32B 2250/40; B32B 2264/0264; B32B 2307/558; B32B 2255/02; B32B 2605/18; B32B 2255/26; C08L 63/00

See application file for complete search history.

(56) References Cited

U.S. PATENT DOCUMENTS

| | | | |
|---|---|---|---|
| 2010/0183862 A1 | 7/2010 | Yokoe et al. | |
| 2012/0035299 A1* | 2/2012 | Arai | C08J 5/24 523/427 |
| 2013/0281573 A1 | 10/2013 | Goto et al. | |
| 2013/0327479 A1* | 12/2013 | Ichino | C08J 5/24 156/307.3 |
| 2014/0087178 A1* | 3/2014 | Arai | B32B 5/04 428/327 |
| 2014/0162518 A1 | 6/2014 | Shimizu et al. | |
| 2014/0205831 A1* | 7/2014 | Schneider | D06M 15/55 428/221 |
| 2016/0122528 A1* | 5/2016 | Kobayashi | C08J 5/24 523/468 |

FOREIGN PATENT DOCUMENTS

| | | | | |
|---|---|---|---|---|
| EP | 3072917 A1 | * | 9/2016 | ............... B32B 5/30 |
| JP | 63-162732 A | | 7/1988 | |
| JP | 07-041577 A | | 2/1995 | |
| JP | 08-034864 A | | 2/1996 | |
| JP | 08-259713 A | | 10/1996 | |
| JP | 9-216958 A | | 8/1997 | |
| JP | 2006-219513 A | | 8/2006 | |
| JP | 2006-297929 A | | 11/2006 | |
| JP | 2009-286895 A | | 12/2009 | |
| JP | 2014-145003 A | | 8/2014 | |
| JP | 2016-147925 A | | 8/2016 | |
| WO | 2008/133054 A1 | | 11/2008 | |
| WO | 2012102201 A1 | | 8/2012 | |
| WO | 2013015299 A1 | | 1/2013 | |
| WO | 2015007862 A1 | | 1/2015 | |

OTHER PUBLICATIONS

Microspec, "Materials: Nylon 12", p. 4, https://www.microspecorporation.com/materials/nylons/nylon-12/ (Year: 2021).*
Japanese Office Action dated Mar. 26, 2019 issued in JP Patent Application 2017-556264 (with English translation).
Notification of Reasons for Refusal dated Aug. 28, 1028 issued in JP Patent Application 2017-556264 (with English translation).
English translation of International Preliminary Report on Patentability dated Apr. 9, 2019 issued in PCT/ JP2017/036139.
International Search Report dated Dec. 12, 2017 issued in PCT/ JP2017/036139.
Chinese Office Action (with partial Machine translation) issued in corresponding Chinese Patent Application No. 201780061356.8, dated Feb. 4, 2021.
Second Chinese Office Action dated Jun. 23, 2021, issued in Chinese Application No. 201780061356.8 (13 pages total, including Machine English Translation).

* cited by examiner

PREPREG, PREPREG LAMINATE, AND FIBER-REINFORCED COMPOSITE MATERIAL

TECHNICAL FIELD

The present invention relates to a prepreg, a prepreg laminate, and a fiber-reinforced composite material.

BACKGROUND ART

Fiber-reinforced composite materials have been widely used in sports and leisure fields, automobile fields, aircraft fields, other general industrial fields, and the like since the materials are lightweight and have high strength and high rigidity. In recent years, in automobile fields, aircraft fields, and the like, particularly, fiber-reinforced composite materials which are lightweight and have high strength and high rigidity have been used.

The fiber-reinforced composite material is a material containing a reinforcing fiber and a matrix resin as essential constituent elements. The fiber-reinforced composite material has a significantly high strength and a significantly high elastic modulus with respect to stress applied along a fiber axial direction in the reinforcing fiber, but is an anisotropic material that has a low strength and a low elastic modulus with respect to stress applied to a direction perpendicular to the fiber axial direction.

The fiber-reinforced composite material is produced, for example, by laminating and molding a prepreg immersed with an uncured thermosetting resin composition as a matrix resin on a reinforcing fiber base material and curing the thermosetting resin composition by heating. In production of the fiber-reinforced composite material, by using a prepreg having a woven fabric of reinforcing fibers as a reinforcing fiber base material or laminating a plurality of prepregs having reinforcing fibers aligned in one direction as a reinforcing fiber base material such that the fiber axial directions direct toward different directions, physical properties with respect to respective directions in the fiber-reinforced composite material are controlled.

However, in the fiber-reinforced composite material produced by laminating prepregs, a fraction of reinforcing fibers in an interlaminar region formed from a matrix resin is small in the vicinity of the surface of the laminated prepregs, and orientations of the reinforcing fibers in both sides of the interlaminar region are different. For this reason, stress is easily concentrated in the interlaminar region of the fiber-reinforced composite material so that wrack in the interlaminar region is dominant with respect to compressive strength after impact or the like. Therefore, it has been known that, even when the strength of the reinforcing fibers is improved, this improvement is not linked to a fundamental improvement in compressive strength after impact or the like of the fiber-reinforced composite material.

For example, Patent Documents 1 and 2 describe a fiber-reinforced composite material in which fine particles of polyamide and the like with high toughness are arranged in an interlaminar region between reinforcing fiber base materials in a prepreg.

Further, for example, Patent Document 3 describes a specific fiber-reinforced composite material in which fine particles having a specific particle diameter distribution index, a specific sphericity, and a specific glass transition temperature are arranged in an interlaminar region and an elastomer component is contained in a matrix resin.

CITATION LIST

Patent Document

Patent Document 1: Japanese Unexamined Patent Application Publication "JP 63-162732 A (published on Jul. 6, 1988)"

Patent Document 2: Japanese Unexamined Patent Application Publication "JP 2009-286895 A (published on Dec. 10, 2009)"

Patent Document 3: WO 2012/102201 A (internationally published on Aug. 2, 2012)

SUMMARY OF THE INVENTION

Problem to be Solved by the Invention

In a case where the fiber-reinforced composite material is used as a large-sized member or a member having a three-dimensionally curved surface shape, for example, a large-sized member such as an aircraft structural member, a windmill blade, or sport and leisure equipment or a member having a three-dimensionally curved surface shape and tensile stress or compressive stress is applied, peel-off stress toward an out-of-plane direction occurs in the interlaminar region of the fiber-reinforced composite material. Cracks generated in the interlaminar region by peel-off stress develop by (opening shape) mode I which acts perpendicular to the crack surface, strength and rigidity of the whole member are degraded, and thus wrack of a whole may occur. Therefore, in the fiber-reinforced composite material, mode I interlaminar fracture toughness becomes one of important characteristics. In this regard, in a case where a cured product of the thermosetting resin composition is used as a matrix resin, the cured product of the thermosetting resin composition has various advantages in terms of cost, productivity, and heat resistance, but has a defect that the cured product is inferior in toughness. For this reason, a problem arises in that toughness in the interlaminar region of the fiber-reinforced composite material is not sufficient.

The fiber-reinforced composite materials described in Patent Documents 1 and 2 have high mode II interlaminar fracture toughness, that is, high interlaminar fracture toughness when delamination cracks develop by (longitudinal shear shape) mode II which acts parallel to the crack surface and perpendicular to the crack front. Therefore, compressive strength after impact is high and damages caused due to falling weight impact to the member surface are suppressed. However, the fiber-reinforced composite materials of Patent Documents 1 and 2 have a problem in that mode I interlaminar fracture toughness necessary for maximization of members or complication like a three-dimensionally curved surface shape is not sufficient.

Further, the fiber-reinforced composite material described in Patent Document 3 has high mode II interlaminar fracture toughness, which is effective for improvement in compressive strength after impact, and high mode I interlaminar fracture toughness, which is necessary for maximization or complication like a three-dimensionally curved surface shape; however, according to expansion of use application of the fiber-reinforced composite material and sophisticated performance required therefor, a further improvement in mode I interlaminar fracture toughness and mode II interlaminar fracture toughness has been demanded.

Means for Solving Problem

The present inventors have conducted intensive studies in order to solve the above-described problems, and as a result, have found that the above-described problems can be solved by producing a fiber-reinforced composite material using a prepreg in which particles of a thermoplastic resin having a melting point or a glass transition temperature within the range of from 90° C. to 140° C. (inclusive) are present in a surface layer, thereby completing the invention. That is, the gist of the invention consists in the following items (1) and (12).

(1) A prepreg containing the following constituent elements (A), (B), and (C), the constituent element (C) being present in a surface layer of the prepreg:

Constituent element (A): a reinforcing fiber base material;

Constituent element (B): an epoxy resin composition containing a curing agent, the epoxy resin composition being cured within the range of from 90° C. to 140° C. (inclusive); and Constituent element (C): particles of a thermoplastic resin having a melting point or a glass transition temperature within the range of from 90° C. to 140° C. (inclusive).

(12) A fiber-reinforced composite material containing the following constituent elements (A), (B), and (C'), two or more layers A, which contains the following constituent element (A) and has the following constituent element (B) as a matrix resin, being present, the fiber-reinforced composite material having a layer of the constituent element (B) containing the following constituent element (C') between the layers A:

Constituent element (A): a reinforcing fiber base material;

Constituent element (B): an epoxy resin composition containing a curing agent, the epoxy resin composition being cured within the range of from 90° C. to 140° C. (inclusive); and Constituent element (C'): a thermoplastic resin having a melting point or a glass transition temperature within the range of from 90° C. to 140° C. (inclusive).

Effect of the Invention

According to the invention, it is possible to provide a novel fiber-reinforced composite material, which is excellent in mode I interlaminar fracture toughness and mode II interlaminar fracture toughness, a prepreg for producing the fiber-reinforced composite material, and a laminate of the prepreg.

MODE(S) FOR CARRYING OUT THE INVENTION

Figure 1:
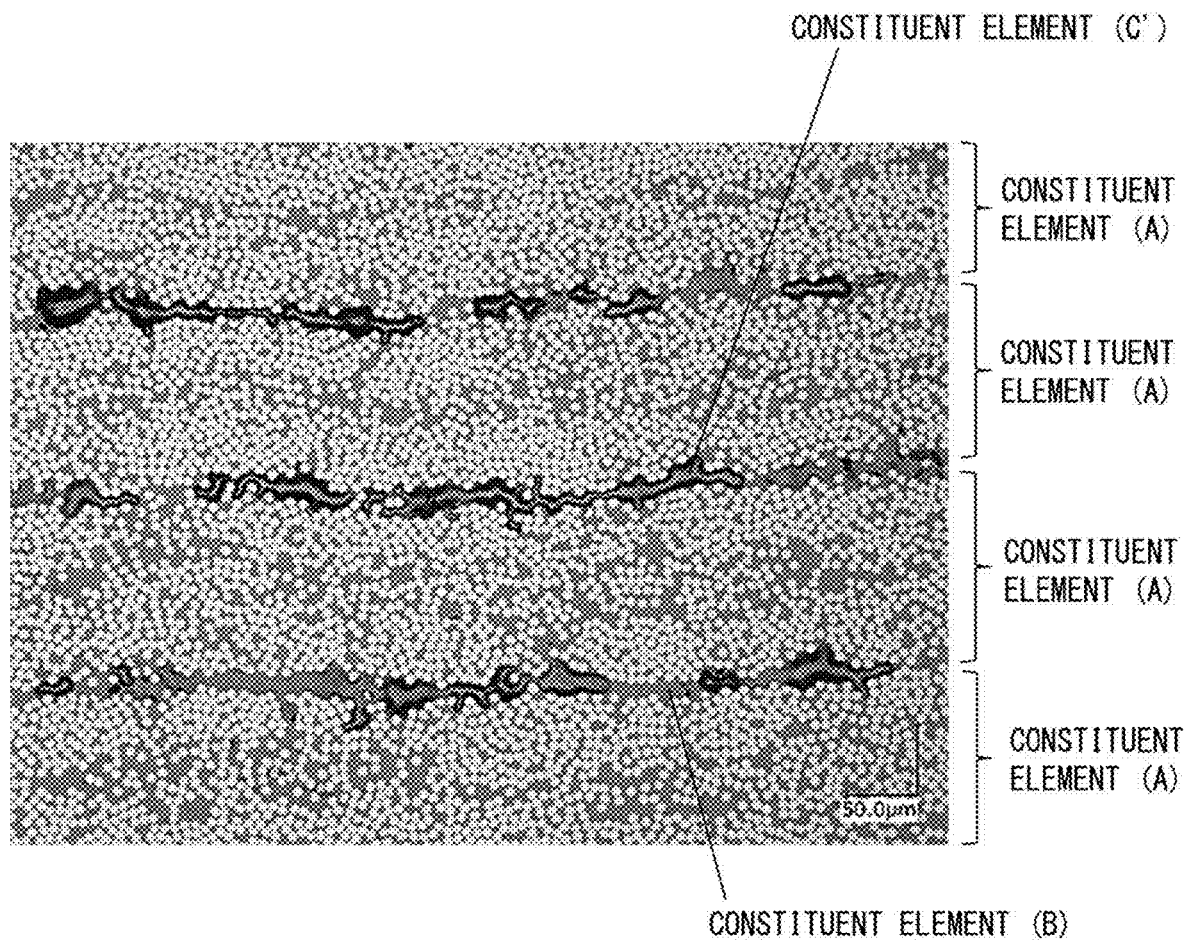
FIG. 1 is an enlarged photograph of a cross-section obtained by cutting a fiber-reinforced composite material of Example 4 in a direction perpendicular to a fiber axial direction.

Hereinafter, a prepreg, a prepreg laminate, a fiber-reinforced composite material, and a production method therefor according to an embodiment of the invention will be described in more detail.

Definition

Incidentally, the following definitions of terms are applied to this specification including claims.

The term "fiber-reinforced composite material" means a material obtained by laminating prepregs and curing a resin component.

The term "crystalline resin" means a resin in which a melting point appears in differential scanning calorimetry (hereinafter, described as DSC).

The term "amorphous resin" means a resin in which a melting point does not appear in DSC.

The term "melting point" means a melting peak temperature obtained by DSC according to Japanese Industrial Standards (JIS) K 7121:1987.

The term "glass transition temperature" means an intermediate glass transition temperature obtained by DSC according to Japanese Industrial Standards (JIS) K 7121:1987.

The term "thermoplastic resin" means both of the "crystalline resin" and the "amorphous resin" unless otherwise stated.

The term "average particle diameter" means a particle diameter (D50) in 50% of cumulative frequency in cumulative distribution based on volume obtained by particle size distribution measurement.

The term "epoxy resin" means a compound having two or more epoxy groups in the molecule.

The term "interlaminar fracture toughness" means a limit value of energy necessary when interlaminar peeking cracks per unit area are generated.

The term "GIC" means a value of mode I interlaminar fracture toughness at the initial stage of crack development.

The term "GIIC" means a value of mode II interlaminar fracture toughness at the initial stage of crack development.

The term "mode I" means a (opening shape) deformation mode in which a direction of crack opening displacement is perpendicular to each crack surface.

The term "mode II" means a (longitudinal shear shape) deformation mode in which a direction of crack opening displacement is parallel to the crack surface and perpendicular to the crack front.

The term "crack opening displacement" means a relative displacement on crack upper and lower surfaces.

A prepreg of the invention is a prepreg containing the following constituent elements (A), (B), and (C), the constituent element (C) being present in a surface layer of the prepreg:

Constituent element (A): a reinforcing fiber base material;

Constituent element (B): an epoxy resin composition containing a curing agent, the epoxy resin composition being cured within the range of from 90° C. to 140° C. (inclusive); and Constituent element (C): particles of a thermoplastic resin having a melting point or a glass transition temperature within the range of from 90° C. to 140° C. (inclusive).

Further, the prepreg of the invention preferably has an average area Sa, which is obtained by the following test method, of 500 μm² or more. The value of the average area Sa is an index that the constituent element (C) is properly dissolved in conditions of the test method described below. The conditions are close to conditions when a fiber-reinforced composite material using the prepreg of the invention is molded, and at the time of molding, the constituent element (A) can be allowed to exist between layers with high frequency without the constituent element (C) being excessively dissolved in the constituent element (B). As a result, excellent interlaminar fracture toughness can be imparted to the fiber-reinforced composite material.

1. The prepreg is cut into a size of 300 mm×200 mm and 20 sheets thereof are laminated to produce a prepreg laminate.
2. A vacuum bag processing is performed by overlaying the prepreg laminate with a vacuum bag, the prepreg laminate is then heated using an autoclave to 80° C. at a temperature increase rate of 4° C./min, the state of 80° C. is maintained for 4 minutes, the prepreg laminate is further heated to 125° C. at a temperature increase rate of 4° C./min, and the state of 125° C. is maintained for 30 minutes. During a period of extracting from heating start, a pressure in the autoclave is set to 0.6 MPa.
3. The heated prepreg laminate is held in the autoclave until the temperature reaches 50° C. or lower at a temperature decrease rate of 3° C./min to produce a molded plate for evaluation.
4. A 20 mm square test piece is cut from the molded plate for evaluation and the cross-section of the test piece is polished.
5. A photograph of the cross-section of the test piece (500 magnifications) is taken using a digital microscope (manufactured by KEYENCE CORPORATION, VHX-5000).
6. Next, areas of all of respective agglomerates derived from the constituent element (C) captured in the photograph are obtained using an area measurement tool of VHX-5000.
7. An average value of all the areas of the agglomerates derived from the constituent element (C) in the captured photograph is obtained as an average area Sa.

<Fiber-Reinforced Composite Material>

The fiber-reinforced composite material according to an embodiment of the invention is a fiber-reinforced composite material which is obtained by laminating two or more prepregs and satisfies a specific condition.

[Prepreg]

Figure 3:
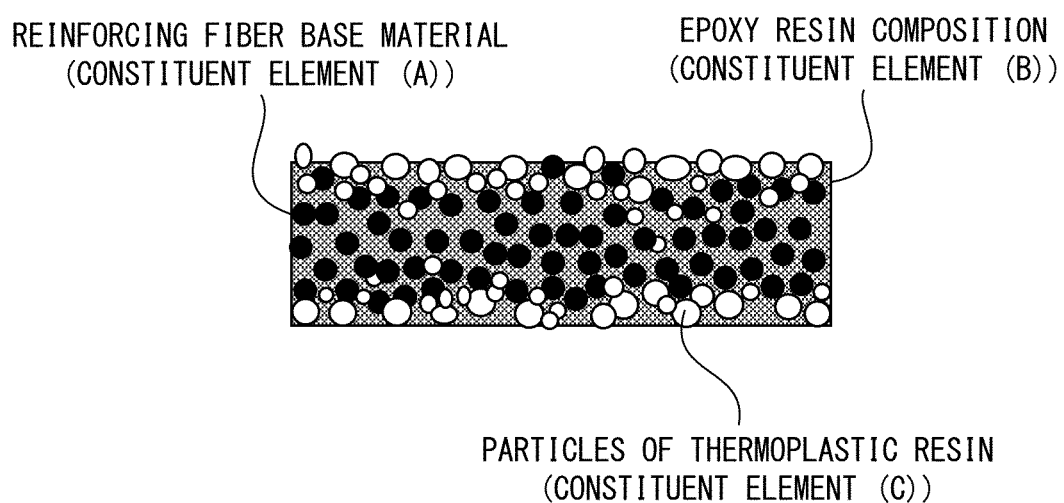
FIG. 3 is a schematic diagram illustrating a cross-section of a prepreg according to an embodiment of the invention.

As illustrated in FIG. 3, the prepreg contains a constituent element (A), a constituent element (B), and a constituent element (C).

(Constituent Element (A))

The constituent element (A) is a sheet-shaped reinforcing fiber base material, and the reinforcing fiber base material may be one in which fibers are arranged in a single one direction or one in which fibers are arranged in a random direction.

Examples of the form of the constituent element (A) include a woven fabric and non-woven fabric of reinforcing fibers, and a sheet in which long fibers of reinforcing fibers are aligned in one direction.

The constituent element (A) is preferably a sheet formed by a bundle of reinforcing fibers in which long fibers are aligned in a single direction from the viewpoint that a fiber-reinforced composite material with a high specific strength and a high specific elastic modulus can be formed, and is a woven fabric of reinforcing fibers from the viewpoint of ease of handleability.

The reinforcing fibers may be long fibers and the long fibers may have a strand shape. Further, the reinforcing fibers may be pulverized (milled) and may be long fibers or those obtained by breaking strands thereof (chopped).

Examples of the material of the reinforcing fiber include glass fibers, carbon fibers (including graphitic fibers), aramid fibers, and boron fibers.

The reinforcing fiber base material is preferably a carbon fiber base material from the viewpoint of mechanical and physical properties and weight saving of the fiber-reinforced composite material.

The tensile strength of the carbon fiber according to Japanese Industrial Standards (JIS) R 7601 is preferably 3500 MPa or more, more preferably 4500 MPa or more, and even more preferably 5000 MPa or more.

For example, in a case where the fiber-reinforced composite material according to an embodiment is used as an aircraft structural member, carbon fibers used in the fiber-reinforced composite material are preferably carbon fibers having a high strand strength, and the strand strength of the carbon fiber according to JIS R 7601 is preferably 3500 MPa or more.

The fiber diameter of the carbon fiber is preferably 3 μm or more and preferably 12 μm or less. When the fiber diameter of the carbon fiber is 3 μm or more, for example, in processes of a comb, a roll, or the like for processing carbon fibers, when the carbon fibers make a horizontal movement to be in friction or the carbon fibers and a roll surface or the like are in friction, the carbon fibers are hardly broken and fuzz of fibers is hardly generated. Therefore, a fiber-reinforced composite material with a stable strength can be suitably produced. Further, when the fiber diameter of the carbon fiber is 12 μm or less, carbon fibers can be produced by a general method.

The number of carbon fibers in the carbon fiber bundle is preferably 1,000 to 70,000.

(Constituent Element (B))

The constituent element (B) is a material constituting a matrix in the fiber-reinforced composite material and is an epoxy resin composition containing dicyandiamide and a urea compound as curing agents. The epoxy resin composition contains dicyandiamide and a urea compound as curing agents and an epoxy resin. Further, the constituent element (B) may contain other components.

(1) Epoxy Resin

As the epoxy resin, typically, a bifunctional or higher epoxy resin having two or more epoxy groups in the molecule is used.

The epoxy resin is preferably an epoxy resin having an oxazolidone ring skeleton from the viewpoint that, while heat resistance and rigidity of a cured product of the constituent element (B) are maintained, toughness can be increased.

The epoxy resin is preferably any one or both of a bisphenol A type epoxy resin which is a liquid at 25° C. and a bisphenol F type epoxy resin which is a liquid at 25° C. from the viewpoint of having a relatively low viscosity and not adversely affecting characteristics of a cured product of the constituent element (B) such as heat resistance and toughness.

Further, the epoxy resin is preferably any one or both of a bisphenol A type epoxy resin which is a solid at 25° C. and a bisphenol F type epoxy resin which is a solid at 25° C. from the viewpoint of imparting toughness to a cured product of the constituent element (B).

Further, the epoxy resin is preferably a trifunctional or higher epoxy resin having three or more epoxy groups in the molecule from the viewpoint of increasing heat resistance of a cured product of the constituent element (B).

(1-1) Epoxy Resin Having Oxazolidone Ring Skeleton

The epoxy resin having an oxazolidone ring skeleton is also called a urethane-modified epoxy resin or an isocyanate-modified epoxy resin.

Examples of commercially available products of the epoxy resin having an oxazolidone ring skeleton include EPICLON TSR-400 manufactured by DIC Corporation, EPOTOTE YD-952 manufactured by NIPPON STEEL & SUMIKIN CHEMICAL CO., LTD., D.E.R. 858 manufactured by The Dow Chemical Company, and LSA3301 manufactured by Asahi Kasei E-Materials Corp.

The proportion of the epoxy resin having an oxazolidone ring skeleton is preferably 5% by mass or more and more preferably 10% by mass or more, and preferably 70% by mass or less and more preferably 50% by mass or less of 100% by mass of the epoxy resin contained in the constituent element (B). When the proportion of the epoxy resin having an oxazolidone ring skeleton is equal to or more than the lower limit of the above range, while heat resistance and rigidity of a cured product of the constituent element (B) are sufficiently maintained, toughness can be suitably increased. Further, when the proportion of the epoxy resin having an oxazolidone ring skeleton is equal to or less than the upper limit of the above range, the viscosity of the constituent element (B) can be prevented from excessively increasing. Therefore, handleability of the constituent element (B) can be enhanced and the prepreg can be suitably produced. Furthermore, tackiness and draping properties of the prepreg can be enhanced.

(1-2) Bisphenol a Type Epoxy Resin and Bisphenol F Type Epoxy Resin

In the constituent element (B), it is preferable that any one or both of a bisphenol A type epoxy resin which is a liquid at 25° C. and a bisphenol F type epoxy resin which is a liquid at 25° C. are used along with the constituent element (B). According to this, an increase in viscosity of the constituent element (B) caused due to blending of the epoxy resin having an oxazolidone ring skeleton can be suppressed.

The bisphenol F type epoxy resin which is a liquid at 25° C. is slightly inferior to the bisphenol A type epoxy resin which is a liquid at 25° C. in heat resistance, but the bisphenol F type epoxy resin is preferable from the viewpoints that the viscosity thereof is lower than that of the liquid bisphenol A type epoxy resin and a relatively high elastic modulus can be imparted to a cured product of the constituent element (B).

Examples of commercially available products of the bisphenol A type epoxy resin which is a liquid at 25° C. include jER (registered trademark) 828 manufactured by Mitsubishi Chemical Corporation, D.E.R. 331 manufactured by The Dow Chemical Company, EPOTOTE YD-128 manufactured by NIPPON STEEL & SUMIKIN CHEMICAL CO., LTD., and EPICLON 850 manufactured by DIC Corporation.

Examples of commercially available products of the bisphenol F type epoxy resin which is a liquid at 25° C. include jER (registered trademark) 807 manufactured by Mitsubishi Chemical Corporation, D.E.R. 354 manufactured by The Dow Chemical Company, EPOTOTE YD-170 manufactured by NIPPON STEEL & SUMIKIN CHEMICAL CO., LTD., and EPICLON 830 manufactured by DIC Corporation.

The total proportion of the bisphenol A type epoxy resin which is a liquid at 25° C. and the bisphenol F type epoxy resin which is a liquid at 25° C. is preferably 10% by mass or more and more preferably 25% by mass or more, and preferably 80% by mass or less and more preferably 65% by mass or less of 100% by mass of the epoxy resin contained in the constituent element (B). When the total proportion of the bisphenol A type epoxy resin which is a liquid at 25° C. and the bisphenol F type epoxy resin which is a liquid at 25° C. is equal to or more than the lower limit of the above range, the epoxy resin composition can be adjusted to have a suitable viscosity. Therefore, handleability of the epoxy resin composition can be enhanced and impregnating into the reinforcing fiber base material can be facilitated. When the total proportion of the bisphenol A type epoxy resin which is a liquid at 25° C. and the bisphenol F type epoxy resin which is a liquid at 25° C. is equal to or less than the upper limit of the above range, an excessive decrease in viscosity of the epoxy resin composition can be suppressed. Therefore, when the prepreg produced by impregnating the epoxy resin composition in a reinforcing fiber base material is cured by heating, leakage of a large amount of the epoxy resin composition outside the system can be suppressed so that the leakage can be prevented from adversely affecting the shape or mechanical characteristics of the fiber-reinforced composite material.

A bisphenol A type epoxy resin which is a solid at 25° C. and a bisphenol F type epoxy resin which is a solid at 25° C. are slightly inferior to the bisphenol A type epoxy resin which is a liquid at 25° C. and the bisphenol F type epoxy resin which is a liquid at 25° C. in heat resistance, but can impart toughness to a cured product of the constituent element (B).

Examples of commercially available products of the bisphenol A type epoxy resin which is a solid at 25° C. include jER (registered trademark) 1001, jER (registered trademark) 1002, jER (registered trademark) 1003, and jER (registered trademark) 1004 manufactured by Mitsubishi Chemical Corporation, EPOTOTE YD-903 manufactured by NIPPON STEEL & SUMIKIN CHEMICAL CO., LTD., and EPICLON 1050, EPICLON 2050, EPICLON 3050, and EPICLON 4050 manufactured by DIC Corporation.

Examples of commercially available products of the bisphenol F type epoxy resin which is a solid at 25° C. include jER (registered trademark) 4004P, jER (registered trademark) 4005P, jER (registered trademark) 4007P, and jER (registered trademark) 4010P manufactured by Mitsubishi Chemical Corporation, and EPOTOTE YD-2001 and EPOTOTE YD-2004 manufactured by NIPPON STEEL & SUMIKIN CHEMICAL CO., LTD.

The total proportion of the bisphenol A type epoxy resin which is a solid at 25° C. and the bisphenol F type epoxy resin which is a solid at 25° C. is preferably 5% by mass or more and more preferably 10% by mass or more, and preferably 70% by mass or less and more preferably 50% by mass or less of 100% by mass of the epoxy resin contained in the constituent element (B). When the total proportion of the bisphenol A type epoxy resin which is a solid at 25° C. and the bisphenol F type epoxy resin which is a solid at 25° C. is equal to or more than the lower limit of the above range, toughness can be sufficiently imparted to a cured product of the constituent element (B). When the total proportion of the bisphenol A type epoxy resin which is a solid at 25° C. and the bisphenol F type epoxy resin which is a solid at 25° C. is equal to or less than the upper limit of the above range, an excessive increase in viscosity of the epoxy resin composition can be suppressed, a degradation in handleability of the epoxy resin composition can be suppressed, and it is possible to suppress that impregnating into the reinforcing fiber base material becomes difficult.

(1-3) Trifunctional or Higher Epoxy Resin

Examples of the trifunctional or higher epoxy resin include a triazine skeleton-containing epoxy resin, an aminophenol type epoxy resin, and an aminocresol type epoxy resin.

Examples of the tetrafunctional or higher epoxy resin include a cresol novolak type epoxy resin, a phenol novolak type epoxy resin, and an aromatic glycidylamine type epoxy resin.

The proportion of the trifunctional or higher epoxy resin is preferably 1% by mass or more and more preferably 5% by mass or more, and preferably within the range of from 60% by mass or less and more preferably 45% by mass or less of 100% by mass of the epoxy resin contained in the constituent element (B). When the proportion of the trifunctional or higher epoxy resin is equal to or more than the lower limit of the above range, the heat resistance of a cured product of the constituent element (B) can be suitably increased. When the proportion of the trifunctional or higher epoxy resin is equal to or less than the upper limit of the above range, an excessive increase in crosslinking density of a cured product of the constituent element (B) can be suppressed, and a significant degradation in toughness of a cured product of the constituent element (B) can be suppressed.

(1-4) Other Epoxy Resins

The constituent element (B) may contain, if necessary, other epoxy resins other than the above-described epoxy resin such as a bisphenol S-type epoxy resin, a naphthalene-type epoxy resin, a biphenyl-type epoxy resin, and a hydantoin-type epoxy resin.

(2) Curing Agent

The curing agent of the epoxy resin is dicyandiamide and a urea compound. By using dicyandiamide and a urea compound as curing agents, the compatibility between the constituent element (B) and the constituent element (C) can be prevented from becoming excessive in the course of curing of the constituent element (B), the constituent element (C) can be allowed to exist between layers of the constituent element (A) with high frequency, and a fiber-reinforced composite material in a state where two or more constituent elements (C) are fused in a sufficient amount can be obtained.

For example, as compared to a case where dicyandiamide and a urea compound are used as curing agents, aromatic polyamine typified by diaminodiphenyl sulfone needs to be heated at a higher temperature for curing. Therefore, in the course of curing the constituent element (B), the compatibility between the constituent element (B) and the constituent element (C) is increased by heat. For this reason, there is a concern that the particulate constituent element (C) cannot be allowed to exist in the interlaminar region of the constituent element (A) with high frequency. Furthermore, in a case where dicyandiamide and a urea compound are used as curing agents, as compared to a case where other curing agents such as imidazole, Lewis acid amine complex, and thiourea-added amine are used as curing agents, a cured product with excellent toughness, that is, a fiber-reinforced composite material which is more excellent in mode I interlaminar fracture toughness and mode II interlaminar fracture toughness can be obtained.

The amount of dicyandiamide added is preferably 3 parts by mass or more and more preferably 4 parts by mass or more, and preferably 10 parts by mass or less and more preferably 7 parts by mass or less per 100 parts by mass of the epoxy resin. When the amount of dicyandiamide added is 3 parts by mass or more, the epoxy resin can be sufficiently cured so that a cured product with higher heat resistance can be obtained. On the other hand, when the amount of dicyandiamide added is 10 parts by mass or less, stress concentration and moisture absorption caused due to excessive dicyandiamide can be suppressed, and a cured product with higher toughness and a small moisture absorption amount can be obtained. Examples of commercially available products of dicyandiamide include DICY-7 and DICY-15 manufactured by Mitsubishi Chemical Corporation, Dyhard (registered trademark) 100s manufactured by AlzChem Group AG and DICYANEX 1400F manufactured by Air Products and Chemicals, Inc.

In the constituent element (B), the urea compound is used for reaction promotion between the epoxy resin and dicyandiamide. As the urea compound used in the fiber-reinforced composite material according to an embodiment, an aromatic urea compound is preferable from the viewpoint of achieving effects of improving storage stability of the epoxy resin composition and improving heat resistance of a cured product. Preferred examples of the aromatic urea compound include N,N-dimethyl-N'-(3,4-dichlorophenyl)urea, toluenebis(dimethylurea), 4,4'-methylenebis(phenyldimethylurea), and 3-phenyl-1,1-dimethylurea. Examples of commercially available products of the aromatic urea compound include DCMU99 manufactured by Hodogaya Chemical Co., Ltd. and OMICURE (registered trademark) 24, OMICURE (registered trademark) 52, and OMICURE (registered trademark) 94 manufactured by PTI JAPAN Corporation. The amount of the urea compound is preferably 0.5 part by mass or more and more preferably 1 part by mass or more, and preferably 7 parts by mass or less and more preferably 5 parts by mass or less per 100 parts by mass of the epoxy resin.

(3) Other Components

Examples of other components which may be contained in the constituent element (B) include known various additives.

Examples of the additives include a thermoplastic resin (excluding the constituent element (C)), elastomer fine particles (excluding the constituent element (C)), core-shell type elastomer fine particles (excluding the constituent element (C)), a diluent, inorganic particle (such as silica), a carbonaceous component (such as carbon nanotube), a flame retardant (such as a phosphorus compound), and a defoaming agent. As the additive, from the viewpoint that toughness is improved without heat resistance of a cured product of the constituent element (B) being degraded and the viewpoint that a large amount of the epoxy resin composition flowing out from the prepreg at the time of adjusting the viscosity of the epoxy resin composition and molding of the epoxy resin composition can be suppressed, any of thermoplastic resin particles (excluding the constituent element (C)) and core-shell type elastomer fine particles are preferable.

Examples of the thermoplastic resin other than the constituent element (C) include polyether sulfone, polyvinyl formal, a phenoxy resin, and an acrylic block copolymer. Examples of commercially available products of polyether sulfone include ULTRASON (registered trademark) E2020 P SR MICRO manufactured by BASF Japan, SUMIKAEXCEL PES 5003P manufactured by Sumitomo Chemical Company, Limited, and Virantage (registered trademark) VW-10200RP and VW-10700RP manufactured by Solvay, examples of commercially available products of polyvinyl formal include VINYLEC manufactured by JNC CORPO- RATION, examples of commercially available products of the phenoxy resin include PHENOTOHT manufactured by NIPPON STEEL & SUMIKIN CHEMICAL CO., LTD. and PKHB, PKHC, and PKHH manufactured by InChem Holdings, Inc., and examples of commercially available products of the acrylic block copolymer include NANOSTRENGTH (registered trademark) series such as NANOSTRENGTH (registered trademark) M52N and M22 manufactured by ARKEMA, Inc. The constituent element (C) has a particulate shape in the epoxy resin composition, but it is preferable that the relevant preferable thermoplastic resin (excluding the constituent element (C)) is dissolved in the epoxy resin in the epoxy resin composition and is in a more uniform state.

Examples of the core-shell type elastomer fine particles include METABLEN (registered trademark) manufactured by MITSUBISHI RAYON CO., LTD., STAPHYROID manufactured by Aica Kogyo Co., Ltd., and Paraloid (registered trademark) manufactured by The Dow Chemical Company.

The core-shell type elastomer fine particles may be dispersed in advance in the epoxy resin. Examples of commercially available products of the core-shell type elastomer fine particle-dispersed epoxy resin include Kane Ace (registered trademark) manufactured by KANEKA CORPORATION and ACRYSET (registered trademark) BP series manufactured by NIPPON SHOKUBAI CO., LTD. The core-shell type elastomer fine particle-dispersed epoxy resin is preferably used from the viewpoints of making a dispersed state of the core-shell type elastomer fine particles in the constituent element (B) favorable as well as facilitating preparation of the constituent element (B).

(4) Method for Preparing Constituent Element (B)

The constituent element (B) can be prepared by various known methods. As the method for preparing the constituent element (B), for example, a method of heating and kneading respective components by a planetary mixer, a kneader, or the like is exemplified.

The dicyandiamide, the aromatic urea compound, and the like serving as curing agents are particulate components and may be agglomerated to cause dispersion defects. For this reason, it is preferable that particulate components are preliminarily kneaded to form master batch. In the preliminary kneading, a kneading device such as a triple roll mill or a ball mill is preferably used. For example, by kneading particulate curing agents to form master batch in advance, it is possible to suppress physical property unevenness and curing defect of a cured product of the constituent element (B) and impregnating defect of the constituent element (B) in the constituent element (A) which are caused due to dispersing defect of the curing agent.

(Constituent Element (C))

The constituent element (C) is particles of the thermoplastic resin having a melting point or glass transition temperature within the range of from 90° C. to 140° C. (inclusive). In a case where the thermoplastic resin is a crystalline resin, the thermoplastic resin has a glass transition temperature and a melting point, and in a case where the thermoplastic resin is an amorphous resin, the thermoplastic resin has only a glass transition temperature. In the invention, in a case where the thermoplastic resin has both of a melting point and a glass transition temperature, the above-described "melting point or glass transition temperature" is regarded as a melting point.

From the viewpoint of interlaminar fracture toughness at the time of using a fiber-reinforced composite material, the constituent element (C) existing on the surface of the prepreg is preferably 60% by mass or more, more preferably 70% by mass or more, particularly preferably 80% by mass or more, even more preferably 90% by mass or more. It is ideal that 100% by mass of the constituent element (C) exists on the surface layer of the prepreg, but the constituent element (A) is slightly incorporated in some cases. Therefore, the constituent element (C) existing on the surface of the prepreg is 100% by mass or less.

(1) Thermoplastic Resin

As the constituent element (C), any thermoplastic resin can be used as long as it is a thermoplastic resin having a melting point or glass transition temperature within the range of from 90° C. to 140° C. (inclusive). More specific examples thereof include a polyamide resin, a polypropylene resin, a polyethylene resin, an acrylic resin, and a methacrylic resin. Among these resins, a polyamide resin can be preferably used as the thermoplastic resin of the constituent element (C) from the viewpoint that the polyamide resin has high toughness and is bonded to the epoxy resin composition at the time of molding to form a relatively strong interface.

(1-1) Polyamide Resin

A polyamide resin which can be preferably used as the thermoplastic resin of the constituent element (C) is not particularly limited as long as it is a resin that has an amide bond in the repeated structure and has a melting point or glass transition temperature within the range of from 90° C. to 140° C. (inclusive). The polyamide resin may be polyamide resin particles formed from one kind of polyamide resin or polyamide resin particles formed from two or more kinds of polyamide resin. In a case where the polyamide resin is polyamide resin particles formed from two or more kinds of polyamide resin, each polyamide resin may exist uniformly in the particles or exist unevenly like a layer structure. The polyamide resin can be obtained by a method such as ring-opening polymerization of lactams, polycondensation of diamine with dicarboxylic acid, or polycondensation of aminocarboxylic acid. Specific examples of the polyamide resin include nylon 6, nylon 46, nylon 66, nylon 11, nylon 12, nylon 610, nylon 612, nylon 6T, nylon 61, nylon 9T, and nylon MST. Further, specific examples of the polyamide resins include polyamide resins containing an aromatic ring or an aliphatic ring such as TROGAMID (registered trademark) T5000 and TROGAMID (registered trademark) CX7323 manufactured by Daicel-Evonik Ltd. These polyamide resins include polyamide whose melting point or glass transition temperature is not within the range of from 90° C. to 140° C. (inclusive), but for example, these polyamide resins are used as copolymerization components to form a copolymer, so that high crystallinity which the polyamide resin originally has can be reduced. That is, the melting point or glass transition temperature of the polyamide resin can be set within the range of from 90° C. to 140° C. (inclusive) so that the polyamide resin can be preferably used as the constituent element (C). Examples of commercially available products having a polyamide resin as a copolymerization component include Grilamid (registered trademark) TR55LX, Grilamid (registered trademark) TR55LY, Grilamid (registered trademark) TR55LZ, Grilamid (registered trademark) TR90LXS, and Griltex (registered trademark) CT100 manufactured by EMS-CHEMIE (Japan) Ltd., and VESTAMELT (registered trademark) 250-P1, VESTAMELT (registered trademark) 350-P1, and VESTAMELT (registered trademark) 730-P1 manufactured by Daicel-Evonik Ltd.

(1-2) Melting Point or Glass Transition Temperature of Thermoplastic Resin

A melting point or glass transition temperature T of the thermoplastic resin constituting the constituent element (C) is preferably 90° C. or higher and more preferably 95° C. or higher, and preferably 140° C. or lower and more preferably 130° C. or lower. When the melting point or glass transition temperature is equal to or more than the lower limit of the above range, in the course of curing the constituent element (B), the constituent element (C) can be allowed to exist between layers of the constituent element (A) with high frequency without the constituent element (C) being excessively dissolved in the constituent element (B). As a result, excellent interlaminar fracture toughness can be imparted to the fiber-reinforced composite material. Further, when the melting point or glass transition temperature is equal to or less than the upper limit of the above range, in the course of curing the constituent element (B), the constituent element (C) can be thermally deformed so that the elements are easily fused to each other. As a result, excellent interlaminar fracture toughness can be imparted to the fiber-reinforced composite material.

(Constituent Element (C'))

The fiber-reinforced composite material is obtained by laminating prepregs and hot forming the laminated prepregs, and the constituent element (C') in the fiber-reinforced composite material is derived from the constituent element (C) of the prepreg as a raw material. That is, the constituent element (C') mainly exists in the constituent element (A) and between layers of the constituent element (A) in the fiber-reinforced composite material obtained by laminating a plurality of prepregs and molding the laminated prepregs, and specifically, the constituent element (C') is formed from (I) those obtained by two or more constituent elements (C) being fused when the laminate of the prepregs is subjected to hot forming to cure the constituent element (B), and the constituent element (C) which is not fused, or (II) only those obtained by two or more constituent elements (C) being fused.

Incidentally, "those obtained by two or more constituent elements (C) being fused" constituting the constituent element (C') is hereinafter referred to as "agglomerate derived from the constituent element (C)."

Further, regarding the constituent element (C'), in the fiber-reinforced composite material according to an embodiment, the constituent element (C') in a state where two or more particles are fused is preferably 60% by mass or more, more preferably 70% by mass or more, particularly preferably 80% by mass or more, and even more preferably 90% by mass or more, of the entirety of the constituent element (C'). 100% by mass of the constituent element (C') is preferable, but generally, the constituent element (C') is 100% by mass or less. Incidentally, as a method of determining whether two or more particles are in a state of being fused, determination can be conducted by the method described in Examples in the present specification.

Further, in the fiber-reinforced composite material according to an embodiment, in order to impart excellent interlaminar fracture toughness, the amount of the constituent element (C') existing between layers of the constituent element (A) is essentially 60% by mass or more of the constituent element (C'), preferably 70% by mass or more, more preferably 80% by mass or more, and even more preferably 90% by mass or more.

(1-3) Average Particle Diameter

The average particle diameter of the constituent element (C) before particles are fused to each other is preferably 5 µm or more, more preferably 10 µm or more, and even more preferably 15 µm or more, and preferably 80 µm or less, more preferably 60 µm or less, and even more preferably 40 µm or less. When the average particle diameter of the constituent element (C) is equal to or more than the lower limit of the above range, it is possible to make the constituent element (C) harder to be introduced into the constituent element (A) when a prepreg or a fiber-reinforced composite material is produced. Therefore, the constituent element (C) can be allowed to exist between layers of the constituent element (A) with high frequency, and in the course of curing the constituent element (B), constituent element (C) is thermally deformed so that the elements are easily fused to each other. As a result, further excellent interlaminar fracture toughness can be imparted to the fiber-reinforced composite material. Further, an increase in viscosity when the constituent element (B) and the constituent element (C) are mixed can be suppressed. When the average particle diameter of the constituent element (C) is equal to or less than the upper limit of the above range, by the constituent element (C) impairing the straightness of the reinforcing fiber of the constituent element (A) in the fiber-reinforced composite material, a degradation in mechanical characteristics of the fiber-reinforced composite material can be suppressed. Further, in production of a prepreg, when a mixture of the constituent element (B) and the constituent element (C) us coated on the surface of exfoliate paper with a uniform thickness, occurrence of clogging can be suppressed by facilities such as a roll coater and a die coater.

(1-4) Area of Agglomerate Derived from Constituent Element (C) in Cross-Section of Fiber-Reinforced Composite Material The average area of agglomerates derived from the constituent element (C) in the cross-section in the thickness direction of the fiber-reinforced composite material is preferably 500 µm$^2$ or more. The average area of agglomerates derived from the constituent element (C) greatly depends on the existence frequency of the constituent element (C') existing between layers of the constituent element (A) and the fused state. Herein, the average area of agglomerates derived from the constituent element (C) being 500 µm$^2$ or more indicates that a sufficient amount of the constituent element (C') for imparting excellent interlaminar fracture toughness exists between layers of the constituent element (A) and the constituent elements (C) are sufficiently fused. In order to impart excellent interlaminar fracture toughness, the average area of agglomerates derived from the constituent element (C) is preferably 500 µm$^2$ or more, more preferably 800 µm$^2$ or more, and even more preferably 1000 µm$^2$ or more. Further, although not limited, the average area of agglomerates derived from the constituent element (C) in the cross-section in the thickness direction of the fiber-reinforced composite material is preferably 6000 µm$^2$ or less. Incidentally, the average area of agglomerates derived from the constituent element (C) in the cross-section in the thickness direction of the fiber-reinforced composite material can be measured by a method described in Examples.

[Prepreg]

The fiber-reinforced composite material according to an embodiment is produced by laminating and curing a prepreg including a constituent element (A), a constituent element (B), and a constituent element (C).

The fiber weight per area (content of reinforcing fibers per 1 m$^2$) of the prepreg may be appropriately set depending on the use application of the prepreg, and may be, for example, 50 to 250 g/m$^2$.

The content percentage of the matrix resin in the prepreg (total percentage of the constituent element (B) and the constituent element (C)) is preferably 25% by mass or more and more preferably 30% by mass or more, and is preferably 45% by mass or less and more preferably 40% by mass or less. When the content percentage of the resin in the prepreg is equal to or less than the lower limit of the above range, it is possible to suppress the tackiness of the prepreg being decreased too much, and the tackiness can be adjusted to be tackiness suitable for handling. Further, it is also possible to prevent the mechanical characteristics of the fiber-reinforced composite material from being degraded due to insufficiency of the constituent element (B) in the prepreg. When the content percentage of the resin in the prepreg is equal to or more than the above range, it is possible to suppress the tackiness of the prepreg being increased too much, and the tackiness can be adjusted to be tackiness suitable for handling. Further, it is also possible to prevent the mechanical characteristics of the fiber-reinforced composite material from being degraded according to a decrease in Vf (volume ratio of the reinforcing fiber base material in the fiber-reinforced composite material) due to the constituent element (B) being excessively contained in the prepreg.

The content of the constituent element (C) is preferably 5 parts by mass or more, more preferably 8 parts by mass or more, and even more preferably 10 parts by mass or more, and preferably 30 parts by mass or less, more preferably 25 parts by mass or less, and even more preferably 20 parts by mass or less, with respect to 100 parts by mass of the constituent element (B). When the content of the constituent element (C) is equal to or more than the lower limit of the above range, the amount of the constituent element (C) unevenly distributed in the interlaminar region is increased. Therefore, the constituent element (C) can be allowed to exist between layers of the constituent element (A) with high frequency, and in the course of curing the constituent element (B), constituent element (C) is thermally deformed so that the elements are easily fused to each other. As a result, excellent interlaminar fracture toughness can be imparted to the fiber-reinforced composite material. When the content of the constituent element (C) is equal to or less than the upper limit of the above range, it is possible to suppress that a proportion of the constituent element (B) in the matrix resin formed by the constituent element (B) and the constituent element (C) which the prepreg contains is excessively decreased, and a degradation in mechanical characteristics of the fiber-reinforced composite material caused due to insufficiency of the constituent element (B) can be prevented.

(Thickness of Prepreg)

The thickness of the prepreg may be appropriately set depending on use application of the prepreg, and for example, may be 0.05 to 0.3 mm.

[Method for Producing Prepreg]

In the fiber-reinforced composite material according to an embodiment, the prepreg can be produced by the method, application thereof, and the like disclosed in Patent Document 2.

As the method for producing the prepreg, from the viewpoints that (i) the constituent element (C) is easily distributed in the interlaminar region formed between the constituent elements (A), (ii) two or more particles in the constituent element (C) present in the interlaminar region are in a fused state, and (iii) it is easy to produce a fiber-reinforced composite material in which an average area of the cross-section in the constituent element (C) in the cross-section in the thickness direction of the fiber-reinforced composite material, one method selected from the group consisting of a method ($\alpha$), a method ($\beta$), a method ($\gamma$), and a method ($\delta$) which will be described later is preferable. Further, from the viewpoints that the constituent element (C) can be more uniformly dispersed in the interlaminar region and many of the constituent elements (C) wafting and scattering in the course of production can be prevented from degrading the production environment, the method ($\gamma$) or the method ($\delta$) is more preferable. Furthermore, of the method ($\gamma$) and the method ($\delta$), from the viewpoints that the constituent element (C) can be further uniformly dispersed in the vicinity of the surface of the prepreg and the constituent element (C) can be unevenly dispersed in the interlaminar region, the method ($\gamma$) is more preferable. Meanwhile, of the method ($\gamma$) and the method ($\delta$), from the viewpoint that the production of the prepreg becomes simpler, the method ($\delta$) is more preferable.

[Method ($\alpha$)]

The method ($\alpha$) is a method of pasting a resin film (F1) formed from the constituent element (B) to one or both surfaces of the constituent element (A), impregnating the constituent element (B) in the constituent element (A) to produce a base prepreg (P1), and spraying the constituent element (C) to one or both surfaces of the base prepreg (P1).

The resin film (F1) can be produced by coating the constituent element (B) on the surface of exfoliate paper or the like.

As the method of immersing the constituent element (B) in the constituent element (A), a known method such as heating and pressurizing using a heating press roll is exemplified.

Incidentally, as the method of spraying the constituent element (C) to one or both surfaces of the base prepreg (P1), for example, a method of uniformly dispersing the constituent element (C) to the surface of the base prepreg (P1) using a powder or granule sprinkle device of a scatter type, roller type, vibration type, or the like.

[Method ($\beta$)]

The method ($\beta$) is a method of pasting a resin film (F1) formed from the constituent element (B) to one or both surfaces of the constituent element (A), immersing the constituent element (B) in the constituent element (A) to produce a base prepreg (P1), producing, separately the base prepreg (P1), a resin film (F2) in which the constituent element (C) is sprayed to the surface of the constituent element (B) formed in a film shape, and pasting the resin film (F2) to one or both surfaces of the base prepreg (P1).

The resin film (F1) and the base prepreg (P1) can be produced in the same manner as in the method ($\alpha$).

The resin film (F2) can be produced by coating the constituent element (B) on the surface of exfoliate paper or the like to mold the constituent element (B) in a film shape and spraying the constituent element (C) to the surface of the molded constituent element (B). Incidentally, the method of spraying the constituent element (C) conforms to the method of spraying the constituent element (C) to the base prepreg (P1) in the method ($\alpha$).

As the method of pasting the resin film (F2) to the base prepreg (P1), a known method such as a method of pressurizing the resin film (F2) under heating by a heating press roll is exemplified. Herein, by appropriately setting the temperature of the heating press roll, the constituent element (B) contained in the resin film (F2) is properly impregnated in the constituent element (A) in the base prepreg (P1) so that the tackiness of the prepreg can be prevented from being significantly degraded. Further, by appropriately setting the pressure applied by the heating press roll, it is possible to prevent that the straightness of the reinforcing fiber is impaired by the constituent element (C) contained in the resin film (F2) being excessively incorporated into the constituent element (A) in the base prepreg (P1) and an uneven distribution rate of the constituent element (C) in the vicinity of the surface of the constituent element (A) is decreased.

The constituent element (B) contained in the base prepreg (P1) and the constituent element (B) contained in the resin film (F2) may have the same resin composition or different resin compositions.

Further, in the method (β), since the resin film (F2) is pasted to the base prepreg (P1) impregnated with the constituent element (B), the content percentage of the constituent element (B) in the base prepreg (P1) is preferably set to be lower as compared to the case of the method (α).

[Method (γ)]

The method (γ) is a method of pasting a resin film (F1) formed from the constituent element (B) to one or both surfaces of the constituent element (A), impregnating the constituent element (B) in the constituent element (A) to produce a base prepreg (P1), producing, separately the base prepreg (P1), a resin film (F3) containing the constituent element (B) and the constituent element (C), and pasting the resin film (F3) to one or both surface of the base prepreg (P1).

The base prepreg (P1) can be produced in the same manner as in method (α).

The resin film (F3) can be produced by coating a mixture of the constituent element (B) and the constituent element (C) on the surface of exfoliate paper or the like.

As the method of pasting the resin film (F3) to the base prepreg (P1), a known method such as a method of pressurizing the resin film (F3) under heating by a heating press roll is exemplified. Incidentally, the method using the heating press roll conforms to the condition in the method (β) described above.

The constituent element (B) contained in the base prepreg (P1) and the constituent element (B) contained in the resin film (F3) may have the same resin composition or different resin compositions.

Further, in the method (γ), since the resin film (F3) containing the constituent element (B) is pasted to the base prepreg (P1), the content percentage of the constituent element (B) in the base prepreg (P1) is preferably set to be lower as compared to the case of the method (α).

[Method (δ)]

The method (δ) is a method of pasting a resin film (F3) containing the constituent element (B) and the constituent element (C) to one or both surfaces of the constituent element (A) and impregnating the constituent element (B) in the constituent element (A).

The resin film (F3) can be formed in the same manner as in the method (γ).

In the method (δ), when the constituent element (B) is impregnated in the constituent element (A), the constituent element (C) is filtered by the constituent element (A) to be unevenly dispersed in the vicinity of the surface of the prepreg. In the method (δ), in order to suitably disperse the constituent element (C) unevenly in the vicinity of the surface of the prepreg, the average particle diameter of the constituent element (C) is preferably larger as compared to the cases of the methods (α) to (γ). The average particle diameter of the constituent element (C) is preferably 7 μm or more and more preferably 10 μm or more, and preferably 80 μm or less and more preferably 60 μm or less.

<Hot Forming>

The fiber-reinforced composite material is obtained by laminating two or more prepregs molded by any one of the aforementioned methods (α) to (δ) and curing the constituent element (B) by hot forming. Incidentally, a laminate obtained by laminating a plurality of prepregs and being in a state before being subjected to hot forming is referred to as a prepreg laminate.

The temperature when the laminated prepregs are subjected to hot forming is a temperature equal to or higher than the melting point or glass transition temperature of the constituent element (C) described above. When the temperature at the time of hot forming is a temperature of the melting point or glass transition temperature of the constituent element (C), particles of the constituent element (C) present in the interlaminar region can be sufficiently fused when the laminated prepregs are heated, and the constituent element (C) can be allowed to extend in the interlaminar region. As a result, excellent interlaminar fracture toughness can be imparted to the fiber-reinforced composite material.

The temperature when the laminated prepregs are subjected to hot forming is not limited as long as it is equal to or higher than the melting point or glass transition temperature of the constituent element (C) and is a temperature at which the constituent element (B) can be sufficiently cured, but the temperature is higher than the melting point or glass transition temperature preferably by 1° C. or higher and more preferably by 2° C. or higher.

The temperature when the laminated prepregs are subjected to hot forming is preferably 100° C. or higher and more preferably 110° C. or higher, and preferably 150° C. or lower and more preferably 140° C. or lower, from the viewpoints of performance of a facility used in hot forming, properties of a secondary material, and characteristics of a fiber-reinforced composite material to be obtained. When the temperature at the time of hot forming is 100° C. or higher, the constituent element (B) can be sufficiently cured and a fiber-reinforced composite material having high heat resistance can be produced. When the temperature at the time of hot forming is 150° C. or lower, the curing reaction rapidly advances so that excessive reaction heat is generated in a short time. According to this, for example, burning of the inside of the fiber-reinforced composite material can be suppressed.

The time for hot forming may be a time for which the constituent element (B) can be sufficiently cured and which is suitable for a hot forming method to be described later. In the case of an autoclave molding method, the time for hot forming is preferably from 0.5 hour to 4 hours (inclusive). When the time for hot forming is 0.5 hour or longer, the constituent element (B) can be sufficiently cured. Further, by setting the time for hot forming to 4 hours or shorter, production cost can be reduced.

Examples of the hot forming method include known methods such as an autoclave molding method, an oven molding method, a press molding method, and an internal pressure molding method. As the hot forming method, from the viewpoint that a fiber-reinforced composite material having further excellent mechanical characteristics can be obtained, an autoclave molding method is preferable. As the hot forming method that can suppress molding cost, a press molding method and an internal pressure molding method are preferable.

The invention is not limited to the embodiments described above; various modifications may be made within the scope indicated in the claims, and embodiments obtained by appropriately combining the technical means disclosed in the different embodiments are also included in the technical scope of the invention.

As described above, the gist of the invention consists in the following items (1) to (12).

(1) A prepreg containing the following constituent elements (A), (B), and (C), the constituent element (C) being present in a surface layer of the prepreg:

Constituent element (A): a reinforcing fiber base material;

Constituent element (B): an epoxy resin composition containing a curing agent, the epoxy resin composition being cured within the range of from 90° C. to 140° C. (inclusive); and Constituent element (C): particles of a thermoplastic resin having a melting point or a glass transition temperature within the range of from 90° C. to 140° C. (inclusive).

(2) The prepreg described in the above item (1), in which an average area Sa obtained by the following test method is 500 μm$^2$ or more.

<Test Method>

1. The prepreg is cut into a size of 300 mm×200 mm and 20 sheets thereof are laminated to produce a prepreg laminate.
2. A vacuum bag processing is performed by overlaying the prepreg laminate with a vacuum bag, the prepreg laminate is then heated using an autoclave to 80° C. at a temperature increase rate of 4° C./min, the state of 80° C. is maintained for 4 minutes, the prepreg laminate is further heated to 125° C. at a temperature increase rate of 4° C./min, and the state of 125° C. is maintained for 30 minutes. During a period of extracting from heating start, a pressure in the autoclave is set to 0.6 MPa.
3. The heated prepreg laminate is held in the autoclave until the temperature reaches 50° C. or lower at a temperature decrease rate of 3° C./min to produce a molded plate for evaluation.
4. A 20 mm square test piece is cut from the molded plate for evaluation and the cross-section of the test piece is polished.
5. A photograph of the cross-section of the test piece (500 magnifications) is taken using a digital microscope (manufactured by KEYENCE CORPORATION, VHX-5000).
6. Next, areas of all of respective agglomerates derived from the constituent element (C) captured in the photograph are obtained using an area measurement tool of VHX-5000.
7. An average value of all the areas of the agglomerates derived from the constituent element (C) in the captured photograph is obtained as an average area Sa.

(3) The fiber-reinforced composite material described in the above item (1) or (2), in which an average particle diameter of the constituent element (C) is from 5 μm to 80 μm (inclusive).

(4) The prepreg described in any one of the above items (1) to (3), in which 60% by mass or more of the following constituent element (C) is present in the surface layer of the prepreg.

(5) The prepreg described in any one of the above items (1) to (4), in which the constituent element (C) is particles of a polyamide resin.

(6) The prepreg described in any one of the above items (1) to (5), in which a content of the constituent element (C) with respect to 100 parts by mass of the constituent element (B) is from 10 parts by mass to 30 parts by mass (inclusive).

(7) The prepreg described in any one of the above items (1) to (6), in which the constituent element (B) contains another thermoplastic resin different from the thermoplastic resin constituting the constituent element (C).

(8) The prepreg described in the above item (7), in which the another thermoplastic resin is at least one resin selected from the group consisting of polyether sulfone, a phenoxy resin, polyvinyl formal, and an acrylic block copolymer.

(9) The prepreg described in any one of the above items (1) to (8), in which the constituent element (B) contains an epoxy resin having an oxazolidone ring skeleton.

(10) The prepreg described in any one of the above items (1) to (9), in which the constituent element (A) is a carbon fiber base material.

(11) A prepreg laminate being obtained by laminating two or more sheets of the prepreg described in any one of the above items (1) to (10).

(12) A fiber-reinforced composite material containing the following constituent elements (A), (B), and (C'), two or more layers A, which contains the following constituent element (A) and has the following constituent element (B) as a matrix resin, being present, the fiber-reinforced composite material having a layer of the constituent element (B) containing the following constituent element (C') between the layers A:

Constituent element (A): a reinforcing fiber base material;

Constituent element (B): an epoxy resin composition containing a curing agent, the epoxy resin composition being cured within the range of from 90° C. to 140° C. (inclusive); and Constituent element (C'): a thermoplastic resin having a melting point or a glass transition temperature within the range of from 90° C. to 140° C. (inclusive).

EXAMPLES

Hereinafter, the invention will be described in more detail be means of Examples, but the invention is not limited thereto.

<Evaluation of Physical Properties of Particles of Thermoplastic Resin>

The melting point, the glass transition temperature, and the average particle diameter of the particles of the thermoplastic resin were measured by methods described below.

(Melting Point)

In a case where the thermoplastic resin is a crystalline resin, the melting point thereof was obtained by differential scanning calorimetry (DSC) according to Japanese Industrial Standards (JIS) K 7121:1987 "Testing Methods for Transition Temperatures of Plastics." Specifically, the melting point thereof was obtained as follows.

The crystalline resin was heated under the temperature increase condition of 10° C./min from room temperature to a temperature higher than the melting point to be estimated by about 30° C., the temperature increase was stopped at a temperature higher than the melting point to be estimated by about 30° C., and this temperature was maintained for 10 minutes. Next, the crystalline resin was cooled under the temperature increase condition of 10° C./min to a temperature lower than the melting point to be estimated by about 50° C. Thereafter, the crystalline resin was heated under the temperature increase condition of 10° C./min to a temperature higher than the melting point to be estimated by about 30° C., and a melting peak temperature of the DSC curve thus obtained was regarded as the melting point.

(Glass Transition Temperature)

In a case where the thermoplastic resin is an amorphous resin, the glass transition temperature thereof was obtained by differential scanning calorimetry (DSC) according to Japanese Industrial Standards (JIS) K 7121:1987 "Testing Methods for Transition Temperatures of Plastics." Specifically, the melting point thereof was obtained as follows.

The amorphous resin was heated under the temperature increase condition of 10° C./min from room temperature to a temperature higher than the glass transition temperature to be estimated by about 30° C., the temperature increase was stopped at a temperature higher than the glass transition temperature to be estimated by about 30° C., and this temperature was maintained for 10 minutes. Next, the amorphous resin was rapidly cooled to a temperature lower than the glass transition temperature to be estimated by about 50° C. Thereafter, the amorphous resin was heated under the temperature increase condition of 20° C./min to a temperature higher than the glass transition temperature to be estimated by about 30° C. to obtain a DSC curve. A point at which the shift of the base line according to glass transition in the obtained DSC curve and a line on the equidistant points in the longitudinal axial direction between a line extended from the base line at the low temperature side and a line extended from the base line at the high temperature side intersect was regarded as the glass transition temperature.

(Average Particle Diameter)

The average particle diameter of the resin particles was obtained as follows.

The particle size distribution measurement was performed using a laser diffraction particle size measurement machine (manufactured by NIKKISO CO., LTD., MODEL: 7340 Microtrac FRA) to obtain cumulative distribution of the resin particles. A particle diameter (D50) at which a cumulative frequency in cumulative distribution based on volume becomes 50% was regarded as the average particle diameter.

(Production of Molded Plate for Evaluation Formed from Fiber-Reinforced Composite Material (Examples 1 to 4 and Comparative Examples 1 to 4))

Figure 2:
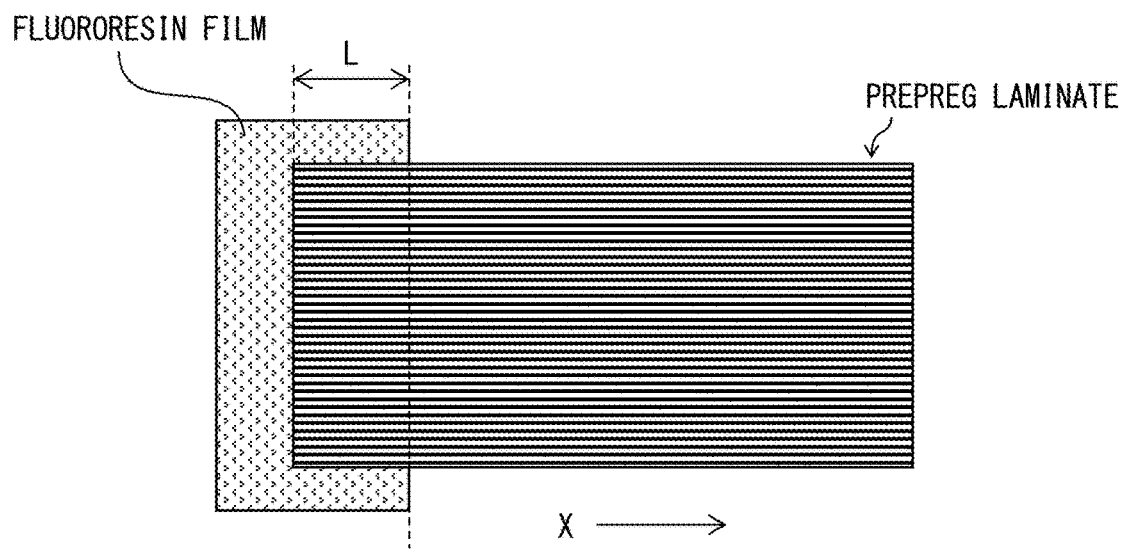
FIG. 2 is a diagram describing an overview of a method for producing an evaluation test plate formed from a fiber-reinforced composite material in Examples and Comparative Examples.

20 sheets of the prepreg were laminated such that the fiber axial directions of the reinforcing fibers were aligned, thereby producing a prepreg laminate. As illustrated in FIG. 2, an elongated fluororesin film having a thickness of 50 μm was sandwiched between the 10th prepreg and the 11th prepreg in the prepreg laminate such that a longitudinal direction formed a right angle to a fiber axial direction X of the reinforcing fiber. Incidentally, as illustrated in FIG. 2, the fluororesin film was sandwiched by the prepreg laminate such that a depth L from one side perpendicular to the fiber axial direction X was about 76 mm. Next, the prepreg laminate sandwiching the fluororesin was overlaid with a vacuum bag without a void being formed therein. The prepreg laminate overlaid with the vacuum bag was heated using an autoclave to 80° C. at a temperature increase speed of 4° C./min, the state of 80° C. was maintained for 4 minutes, the prepreg laminate was further heated to 125° C. at a temperature increase speed of 4° C./min, and the state of 125° C. was maintained for 30 minutes. The heated prepreg was held in the autoclave until the temperature reached 50° C. or lower at a temperature decrease speed of 3° C./min to produce a molded plate for evaluation. Incidentally, in production of the molded plate for evaluation, during a period of extracting from heating start, a pressure in the autoclave was set to 0.6 MPa.

(Production of Molded Plate for Evaluation Formed from Fiber-Reinforced Composite Material (Comparative Example 5))

20 sheets of the prepreg were laminated such that the fiber axial directions of the reinforcing fibers were aligned, thereby producing a prepreg laminate. As illustrated in FIG. 2, an elongated fluororesin film having a thickness of 50 μm was sandwiched between the 10th prepreg and the 11th prepreg in the prepreg laminate such that the longitudinal direction formed a right angle to the fiber axial direction X of the reinforcing fiber. Incidentally, as illustrated in FIG. 2, the fluororesin film was sandwiched by the prepreg laminate such that the depth L from one side perpendicular to the fiber axial direction X was about 76 mm. Next, the prepreg laminate sandwiching the fluororesin was overlaid with a vacuum bag without a void being formed therein. The prepreg laminate overlaid with the vacuum bag was heated using an autoclave to 80° C. at a temperature increase speed of 4° C./min, the state of 80° C. was maintained for 4 minutes, the prepreg laminate was further heated to 180° C. at a temperature increase speed of 4° C./min, and the state of 180° C. was maintained for 30 minutes. The heated prepreg was held in the autoclave until the temperature reached 50° C. or lower at a temperature decrease speed of 3° C./min to produce a molded plate for evaluation. Incidentally, in production of the molded plate for evaluation, during a period of extracting from heating start, a pressure in the autoclave was set to 0.6 MPa.

(Uneven Distribution Rate of Constituent Element (C'))

First, for taking a photograph, a 20 mm square test piece was cut from a molded plate for evaluation. Then, the cross-section of the test piece was polished using a polishing machine (manufactured by Refine Tec Ltd., REFINE-POLISHER APM-122). A photograph of the cross-section of the test piece (500 magnifications) was taken using a digital microscope (manufactured by KEYENCE CORPORATION, VHX-5000). From the captured photograph, the mass of each of a cutout of the constituent element (C') in the interlaminar region between the reinforcing fiber base materials and a cutout of the constituent element (C') in the reinforcing fiber base material was weighed, and the weighed masses were substituted as the mass of the constituent element (C') in the interlaminar region and the mass of the constituent element (C') in the reinforcing fiber base material into the following Equation (1) to calculate an uneven distribution rate.

$$\text{Uneven distribution rate} = C1/(C1+C2) \times 100 \qquad \text{Equation (1)}$$

C1: Mass of the constituent element (C') existing in the interlaminar region

C2: Mass of the constituent element (C') in the reinforcing fiber base material (Average Area Sa of Agglomerate Derived from Constituent Element (C) in Cross-Section in Thickness Direction of Fiber-Reinforced Composite Material)

1. The prepreg was cut into a size of 300 mm×200 mm and 20 sheets thereof were laminated to produce a prepreg laminate.

2. A vacuum bag processing was performed by overlaying the prepreg laminate with a vacuum bag, the prepreg laminate was then heated using an autoclave to 80° C. at a temperature increase rate of 4° C./min, the state of 80° C. was maintained for 4 minutes, the prepreg laminate was further heated to 125° C. at a temperature increase rate of 4° C./min, and the state of 125° C. was maintained for 30 minutes. During a period of extracting from heating start, a pressure in the autoclave was set to 0.6 MPa.

3. The heated prepreg laminate was held in the autoclave until the temperature reached 50° C. or lower at a temperature decrease rate of 3° C./min to produce a molded plate for evaluation.

4. A 20 mm square test piece was cut from the molded plate for evaluation and the cross-section of the test piece was polished.
5. A photograph of the cross-section of the test piece (500 magnifications) was taken using a digital microscope (manufactured by KEYENCE CORPORATION, VHX-5000).
6. Next, areas (that is, S1, S2, . . . Sn) of all of respective agglomerates derived from the constituent element (C) captured in the photograph were obtained using an area measurement tool of VHX-5000.
7. An average value of all the areas of the agglomerates derived from the constituent element (C) in the captured photograph was obtained as an average area Sa. Incidentally, in a case where there is an agglomerate derived from the constituent element (C) photographed in a state where a part thereof is cut in the photograph, a photograph was taken again such that the entirety of the relevant agglomerate derived from the constituent element (C) was included, and the average area Sa was obtained while the area of the relevant agglomerate derived from the constituent element (C) was also included.

For example, in the cross-section in the thickness direction of the fiber-reinforced composite material, agglomerates derived from the constituent element (C) are observed in five sites in the photograph (500 magnifications), and in a case where the areas are S1: 1800 $\mu m^2$, S2: 2400 $\mu m^2$, S3: 1000 $\mu m^2$, S4: 500 $\mu m^2$, and S5: 1500 $\mu m^2$, respectively, the average area Sa of the agglomerates derived from the constituent element (C) is 1440 $\mu m^2$ obtained by dividing the sum of 1800 $\mu m^2$, 2400 $\mu m^2$, 1000 $\mu m^2$, 500 $\mu m^2$, and 1500 $\mu m^2$ by 5 that is the number of agglomerates derived from the constituent element (C).

(Method of Determining Whether Particles of Constituent Element (C) are in State where Two or More Particles are Fused)

With respect to 100 parts by mass of jER (registered trademark) 828 manufactured by Mitsubishi Chemical Corporation as a bisphenol A type epoxy resin which is a liquid at 25° C., 10 parts by mass of the constituent element (C) and 25 parts by mass of jERCURE (registered trademark) U, which is modified aliphatic amine, as a curing agent of the epoxy resin were added and stirred and defoamed using Mazerustar KK-2505 (manufactured by KURABO INDUSTRIES LTD.) to obtain an epoxy resin composition containing the constituent element (C). Further, the epoxy resin composition containing the constituent element (C) was allowed to flow into a resinous cylindrical mold (inner diameter: 38 mm, outer diameter: 43 mm, depth: 25 mm) until the resin surface reached a depth of about 20 mm of the cylindrical mold and was left to stand still for 30 minutes or longer at room temperature to obtain a standard epoxy resin cured product containing the constituent element (C). The standard epoxy resin cured product was polished using a polishing machine (manufactured by Refine Tec Ltd., REFINE-POLISHER APM-122). A photograph of the polished surface of the standard epoxy resin cured product (500 magnifications) was taken using a digital microscope (manufactured by KEYENCE CORPORATION, VHX-5000). Areas of all of the constituent elements (C) captured in the photograph were obtained using an area measurement tool of VHX-5000. The obtained areas of n constituent elements (C) (that is, P1, . . . P2, Pn) were obtained, and the average value thereof was regarded as an average value Sp of the cross-sectional area in one particle which is not fused. In a case where there is a constituent element (C) photographed in a state where a part thereof is cut in the photograph, a photograph was taken again similarly to the case of obtaining the average area Sa, and the average value Sp was obtained while the area of the relevant constituent element (C) was also included.

When the average area Sa of agglomerates derived from the constituent element (C) in the fiber-reinforced composite material and the average value Sp of cross-sectional areas of the constituent element (C) in the standard epoxy resin cured product are compared to each other, if the average area Sa is larger than the average value Sp, it was determined that, in the fiber-reinforced composite material, the agglomerates derived from the constituent element (C) are in a state where two or more agglomerates are fused.

(Abundance Ratio (% by Mass) of Constituent Element (C) in which Two or More Thereof are Fused)

A photograph of the cross-section (500 magnifications) was taken according to the same procedures as in the evaluation of the uneven distribution rate of the constituent element (C'), and areas of all of the constituent elements (C') captured in the photograph were obtained using an area measurement tool of VHX-5000. Next, the obtained areas of n constituent elements (C') (that is, S1, S2, . . . Sn) were obtained as a total value St of the cross-sectional areas. Incidentally, in a case where there is a constituent element (C') photographed in a state where a part thereof is cut in the photograph, a photograph was taken again such that the entirety of the relevant constituent element (C') was included, and a total value St of the cross-sectional areas was obtained while the area of the relevant constituent element (C') was also included.

Furthermore, according to the method of determining whether particles are in a state of being fused, it was determined whether the respective constituent elements (C) are in a state where two or more thereof are fused with respect to the obtained areas of the constituent elements (C') (that is, S1, S2, . . . Sn), and a total value Sf of the areas of the constituent elements (C) in a state where two or more thereof are fused was obtained. Thereafter, an abundance ratio (% by mass) of the constituent elements (C) in a state where two or more thereof are fused among all of the constituent elements (C') was obtained by Equation (2).

$$\text{Abundance ratio (\% by mass)}=Sf/St\times100 \quad \text{Equation (2)}$$

(Measurement of GIC)

GIC of the molded plate for evaluation formed from the fiber-reinforced composite material was measured using an instron type universal tester (manufactured by Instron Corporation) according to ASTM D5528. Regarding the measured GIC, a case where GIC is 1.5 $kJ/m^2$ or more was evaluated as "Good," a case where GIC is 2.0 $kJ/m^2$ or more was evaluated as "Better," and a case where GIC is 2.5 $kJ/m^2$ or more was evaluated as "Best."

(Measurement of GIIC)

GIIC of the molded plate for evaluation formed from the fiber-reinforced composite material was measured using an instron type universal tester (manufactured by Instron Corporation) according to Japanese Industrial Standards (JIS) K 7086:1993. Regarding the measured GIIC, a case where GIIC is 1.5 $kJ/m^2$ or more was evaluated as "Good," a case where GIIC is 2.0 $kJ/m^2$ or more was evaluated as "Better," and a case where GIIC is 2.5 $kJ/m^2$ or more was evaluated as "Best."

<Raw Material>

Raw materials used in Examples 1 to 4 and Comparative Examples 1 and 2 are as follows.

[Constituent Element (A)]
(Reinforcing Fiber Bundle)
TR50S: Carbon fiber bundle (manufactured by MITSUBISHI RAYON CO., LTD., PYROFIL (registered trademark) TR50S 15L, strand strength: 4900 MPa, elastic modulus: 240 GPa, fiber diameter of carbon fiber: 6.8 µm, the number of carbon fibers: 15000)

[Constituent Element (B)]
(Epoxy Resin)
TSR-400: Epoxy resin having an oxazolidone ring skeleton (manufactured by DIC Corporation, EPICLON TSR-400)
jER828: Bisphenol A-type liquid epoxy resin (manufactured by Mitsubishi Chemical Corporation, jER (registered trademark) 828)
jER1001: Bisphenol A-type solid epoxy resin (manufactured by Mitsubishi Chemical Corporation, jER (registered trademark) 1001)
jER1002: Bisphenol A-type solid epoxy resin (manufactured by Mitsubishi Chemical Corporation, jER (registered trademark) 1002)

(Curing Agent)
DICY15: Dicyandiamide (manufactured by Mitsubishi Chemical Corporation, jERCURE (registered trademark) DICY15)
DCMU99: 3-(3,4-Dichlorophenyl)-1,1-dimethy urea (manufactured by Hodogaya Chemical Co., Ltd., DCMU99)
OMICURE 94: Phenyldimethylurea (manufactured by PTI Japan Corporation, OMICURE 94)

[Constituent Element (C)]
CT100: Copolymer polyamide particles (manufactured by EMS-CHEMIE (Japan) Ltd., Griltex (registered trademark) CT 100 P0-35, melting point: 124° C., average particle diameter: 27 µm)
730-P1: Copolymer polyamide particles (manufactured by Daicel-Evonik Ltd., VESTAMELT (registered trademark) 730-P1, melting point: 102° C., average particle diameter: 52 µm)
750-P1: Copolymer polyamide particles (manufactured by Daicel-Evonik Ltd., VESTAMELT (registered trademark) 750-P1, melting point: 102° C., average particle diameter: 52 nm)

[Arbitrary Components]
VINYLEC E: Polyvinyl formal resin (manufactured by JNC CORPORATION, VINYLEC E)
M52N: Acrylic-methacrylic copolymer (manufactured by ARKEMA, Inc., NANOSTRENGTH (registered trademark) M52N)

Example 1

(Preparation of Constituent Element (B))

As a raw material composition (also referred to as master batch) 1a of the constituent element (B), to a glass flask, 44.6 parts by mass of jER828, 17.9 parts by mass of jER1002, 26.8 parts by mass of TSR-400, and 2.7 parts by mass of VINYLEC E were added. The raw material composition 1a was mixed under heating using an oil bath set to a temperature of 140 to 160° C. until the raw material composition 1a became homogeneous.

Meanwhile, as a raw material composition 1b of the constituent element (B), to a container of a rotation-revolution mixer, 10.7 parts by mass of jER828, 5.4 parts by mass of DICY15, and 3.6 parts by mass of DCMU99 were added and the raw material composition 1b was stirred. Further, DICY15 and DCMU99 in the raw material composition 1b were homogeneously dispersed in jER828 using a roll mill. To a container of a planetary mixer, 92.0 parts by mass of the raw material composition 1a in the glass flask cooled to a temperature of about 60° C. and 19.7 parts by mass of the raw material composition 1b were added, the jacket temperature was set to 60 to 65° C., and each of the compositions was mixed until they become homogeneous, thereby preparing the constituent element (B).

(Preparation of Mixture (BC))

To 111.7 parts by mass of the prepared constituent element (B), 13.4 parts by mass of CT100 was added. That is, the content of the CT100 with respect to 100 parts by mass of the constituent element (B) is 12.0 parts by mass. The jacket temperature of the planetary mixer was set to 60 to 70° C. and mixing was performed until the elements became homogeneous, thereby preparing a mixture (BC) of the constituent element (B) and the constituent element (C).

(Production of Prepreg)

A prepreg of Example 1 was produced according to the aforementioned method (δ).

The mixture (BC) was coated on a surface of exfoliate paper using a hot melt coater to have a uniform thickness, thereby producing a resin film (F3).

The produced resin film (F3) was pasted to both surfaces of the constituent element (A) formed in a sheet shape in which a plurality of TR50Ss are aligned and was pressurized under heating to immerse the constituent element (B) in the constituent element (A), thereby producing a prepreg. At this time, in the prepreg, by filtering the constituent element (C) contained in the constituent element (B) by the constituent element (A), the constituent element (C) was unevenly distributed in the vicinity of the surface of the prepreg. The composition and the production method of the prepreg are presented in Table 1.

(Production of Fiber-Reinforced Composite Material)

A molded plate for evaluation of Example 1 was produced according to the aforementioned method. The molded plate for evaluation of Example 1 was evaluated. The results thereof are presented in Table 1.

Example 2

(Preparation of Constituent Element (B))

As a raw material composition 2a of the constituent element (B), to a glass flask, 29.8 parts by mass of jER828, 42.4 parts by mass of jER1001, 18.1 parts by mass of TSR-400, and 5.4 parts by mass of M52N were added. The raw material composition 2a was mixed under heating using an oil bath set to a temperature of 140 to 160° C. until the raw material composition 2a became homogeneous.

Meanwhile, as a raw material composition 2b of the constituent element (B), to a container of a rotation-revolution mixer, 9.7 parts by mass of jER828, 5.2 parts by mass of DICY15, and 1.4 parts by mass of OMICURE 94 were added and the raw material composition 2b was stirred. Further, DICY15 and OMICURE 94 in the raw material composition 2b were homogeneously dispersed in jER828 using a roll mill. To a container of a planetary mixer, 95.7 parts by mass of the raw material composition 2a in the glass flask cooled to a temperature of about 60° C. and 16.3 parts by mass of the raw material composition 2b were added, the jacket temperature was set to 60 to 65° C., and each of the compositions was mixed until they become homogeneous, thereby preparing the constituent element (B) used in Example 2.

(Preparation of Mixture (BC))

To 112.0 parts by mass of the prepared constituent element (B), 13.6 parts by mass of CT100 was added. That is, the content of the CT100 with respect to 100 parts by mass of the constituent element (B) is 12.1 parts by mass. The jacket temperature of the planetary mixer was set to 60 to 70° C. and mixing was performed until the elements became homogeneous, thereby preparing a mixture (BC) used in Example 2.

(Production of Prepreg)

A prepreg used in Example 2 was produced in the same manner as in Example 1, except that the mixture (BC) was changed. The composition and the production method of the prepreg are presented in Table 1.

(Production of Fiber-Reinforced Composite Material)

A molded plate for evaluation of Example 2 was produced according to the aforementioned method. The molded plate for evaluation of Example 2 was evaluated. The results thereof are presented in Table 1.

Example 3

(Preparation of Constituent Element (B))

The constituent element (B) was obtained in the same manner as in Example 2.

(Preparation of Mixture (BC))

To 112.0 parts by mass of the constituent element (B), 13.6 parts by mass of 730-P1 was added. That is, the content of the 730-P1 with respect to 100 parts by mass of the constituent element (B) is 12.1 parts by mass. The jacket temperature of the planetary mixer was set to 60 to 70° C. and mixing was performed until the elements became homogeneous, thereby preparing a mixture (BC) used in Example 3.

(Production of Prepreg)

A prepreg used in Example 3 was produced in the same manner as in Example 1, except that the mixture (BC) was changed. The composition and the production method of the prepreg are presented in Table 1.

(Production of Fiber-Reinforced Composite Material)

A molded plate for evaluation of Example 3 was produced according to the aforementioned method. The molded plate for evaluation of Example 3 was evaluated. The results thereof are presented in Table 1.

Example 4

(Preparation of Constituent Element (B))

The constituent element (B) was obtained in the same manner as in Example 2.

(Preparation of Mixture (BC))

To 112.0 parts by mass of the prepared constituent element (B), 13.6 parts by mass of 730-P1 was added. That is, the content of 730-P1 with respect to 100 parts by mass of the constituent element (B) is 12.1 parts by mass. The jacket temperature of the planetary mixer was set to 60 to 70° C. and mixing was performed until the elements became homogeneous, thereby preparing a mixture (BC) used in Example 4.

(Production of Prepreg)

A prepreg used in Example 4 was produced in the same manner as in Example 1, except that the mixture (BC) was changed. The composition and the production method of the prepreg are presented in Table 1.

(Production of Fiber-Reinforced Composite Material)

A molded plate for evaluation of Example 4 was produced according to the aforementioned method. The molded plate for evaluation of Example 4 was evaluated. The results thereof are presented in Table 1.

Comparative Example 1

(Preparation of Constituent Element (B))

As a raw material composition 3a of the constituent element (B), to a glass flask, 36.6 parts by mass of jER828, 25.9 parts by mass of jER1002, 26.8 parts by mass of TSR-400, and 2.7 parts by mass of VINYLEC E were added. The raw material composition 3a was mixed under heating using an oil bath set to a temperature of 140 to 160° C. until the raw material composition 3a became homogeneous.

Meanwhile, as a raw material composition 3b of the constituent element (B), to a container of a rotation-revolution mixer, 10.7 parts by mass of jER828, 5.4 parts by mass of DICY15, and 3.6 parts by mass of DCMU99 were added and the raw material composition 3b was stirred. Further, DICY15 and DCMU99 in the raw material composition 3b were homogeneously dispersed in jER828 using a roll mill. To a container of a planetary mixer, 92.0 parts by mass of the raw material composition 3a in the glass flask cooled to a temperature of about 60° C. and 19.7 parts by mass of the raw material composition 3b were added, the jacket temperature was set to 60 to 65° C., and each of the compositions was mixed until they become homogeneous, thereby preparing the constituent element (B) used in Comparative Example 1.

(Production of Prepreg)

The mixture (B) was coated on a surface of exfoliate paper using a hot melt coater to have a uniform thickness, thereby producing a resin film (F').

The resin film (F') was pasted to both surfaces of the constituent element (A) formed in a sheet shape in which a plurality of TR50Ss are aligned and was pressurized under heating to immerse the constituent element (B) in the constituent element (A), thereby producing a prepreg used in Comparative Example 1. The composition and the production method of the prepreg are presented in Table 1.

(Production of Fiber-Reinforced Composite Material)

A molded plate for evaluation of Comparative Example 1 was produced according to the aforementioned method. The molded plate for evaluation of Comparative Example 1 was evaluated. The results thereof are presented in Table 1.

Comparative Example 2

(Preparation of Constituent Element (B)) The constituent element (B) was obtained in the same manner as in Example 2.

(Production of Prepreg)

A prepreg used in Comparative Example 2 was produced in the same manner as in Comparative Example 1, except that the mixture (B) was changed. The composition and the production method of the prepreg are presented in Table 1.

(Production of Fiber-Reinforced Composite Material)

A molded plate for evaluation of Comparative Example 2 was produced according to the aforementioned method. The molded plate for evaluation of Comparative Example 2 was evaluated. The results thereof are presented in Table 1.

Comparative Example 3

(Preparation of Constituent Element (B))

The constituent element (B) was obtained in the same manner as in Example 2.

(Preparation of Mixture of Constituent Element (B) and Thermoplastic Resin Particles other than Constituent Element (C))

To 112.0 parts by mass of the prepared constituent element (B), 13.6 parts by mass of Orgasol 3501 was added. That is, the content of Orgasol 3501 with respect to 100 parts by mass of the constituent element (B) is 12.1 parts by mass. The jacket temperature of the planetary mixer was set to 60 to 70° C. and mixing was performed until the elements became homogeneous, thereby preparing a mixture of the constituent element (B) and thermoplastic resin particles other than the constituent element (C) used in Comparative Example 3.

(Production of Prepreg)

A prepreg used in Comparative Example 3 was produced in the same manner as in Example 1, except that the mixture (BC) was changed to the mixture of the constituent element (B) and thermoplastic resin particles other than the constituent element (C). The composition and the production method of the prepreg are presented in Table 1.

(Production of Fiber-Reinforced Composite Material)

A molded plate for evaluation of Comparative Example 3 was produced according to the aforementioned method. The molded plate for evaluation of Comparative Example 3 was evaluated. The results thereof are presented in Table 1.

Comparative Example 4

(Preparation of Constituent Element (B))

The constituent element (B) was obtained in the same manner as in Example 2.

(Preparation of Mixture of Constituent Element (B) and Thermoplastic Resin Particles other than Constituent Element (C))

To 112.0 parts by mass of the prepared constituent element (B), 13.6 parts by mass of Vestosint 2158 was added. That is, the content of Vestosint 2158 with respect to 100 parts by mass of the constituent element (B) is 12.1 parts by mass. The jacket temperature of the planetary mixer was set to 60 to 70° C. and mixing was performed until the elements became homogeneous, thereby preparing a mixture of the constituent element (B) and thermoplastic resin particles other than the constituent element (C) used in Comparative Example 4.

(Production of Prepreg)

A prepreg used in Comparative Example 4 was produced in the same manner as in Example 1, except that the mixture (BC) was changed to the mixture of the constituent element (B) and thermoplastic resin particles other than the constituent element (C). The composition and the production method of the prepreg are presented in Table 1.

(Production of Fiber-Reinforced Composite Material)

A molded plate for evaluation of Comparative Example 4 was produced according to the aforementioned method. The molded plate for evaluation of Comparative Example 4 was evaluated. The results thereof are presented in Table 1.

Comparative Example 5

(Preparation of Constituent Element (B))

The constituent element (B) was obtained in the same manner as in Example 2.

(Preparation of Mixture of Constituent Element (B) and Thermoplastic Resin Particles other than Constituent Element (C))

A mixture of the constituent element (B) and thermoplastic resin particles other than the constituent element (C) was prepared in the same manner as in Comparative Example 4.

(Production of Prepreg)

A prepreg was produced in the same manner as in Comparative Example 4. The composition and the production method of the prepreg are presented in Table 1.

(Production of Fiber-Reinforced Composite Material)

A molded plate for evaluation of Comparative Example 5 was produced according to the aforementioned method. The molded plate for evaluation of Comparative Example 5 was evaluated. The results thereof are presented in Table 1.

TABLE 1

| | | | | Example 1 | Example 2 | Example 3 | Example 4 | Comparative Example 1 | Comparative Example 2 |
|---|---|---|---|---|---|---|---|---|---|
| | Component (A) | | TR50S | Used | Used | Used | Used | Used | Used |
| Component (B) | Epoxy resin | | jER828 | 55.3 | 39.5 | 39.5 | 39.5 | 47.3 | 39.5 |
| | | | jER1001 | 0 | 42.4 | 42.4 | 42.4 | 0 | 42.4 |
| | | | jER1002 | 17.9 | 0 | 0 | 0 | 25.9 | 0 |
| | | | TSR-400 | 26.8 | 18.1 | 18.1 | 18.1 | 26.8 | 18.1 |
| | Dicyandiamide | | DICY15 | 5.4 | 5.2 | 5.2 | 5.2 | 5.4 | 5.2 |
| | Urea compound | | DCMU99 | 3.6 | 0 | 0 | 0 | 3.6 | 0 |
| | | | OMICURE 94 | 0 | 1.4 | 1.4 | 1.4 | 0 | 1.4 |
| | Arbitrary component | | VINYLEC E | 2.7 | 0 | 0 | 0 | 2.7 | 0 |
| | | | M52N | 0 | 5.4 | 5.4 | 5.4 | 0 | 5.4 |
| Component (C) | | | CT100 | 13.4 | 13.6 | 0 | 0 | 0 | 0 |
| | | | 730-P1 | 0 | 0 | 13.6 | 0 | 0 | 0 |
| | | | 750-P1 | 0 | 0 | 0 | 13.6 | 0 | 0 |
| Thermoplastic resin particles other than component (C) | | | Orgasol 3501 | 0 | 0 | 0 | 0 | 0 | 0 |
| | | | Vestosint 2158 | 0 | 0 | 0 | 0 | 0 | 0 |
| Content of component (C) with respect to 100 parts by mass of component (B) | | | (parts by mass) | 12.0 | 12.1 | 12.1 | 12.1 | 0.0 | 0.0 |
| Prepreg | FAW of prepreg | | (g/m$^2$) | 150 | 150 | 150 | 150 | 150 | 150 |
| | Content of resin in prepreg (component (C) is also calculated as part of matrix resin) | | (wt %) | 37.5 | 37.5 | 37.5 | 37.5 | 37.5 | 37.5 |

TABLE 1-continued

|  |  |  |  |  |  |  |  |  |
|---|---|---|---|---|---|---|---|---|
|  | Content of resin particles in prepreg | (g/m2) | 10.8 | 10.9 | 10.9 | 10.9 | 0.0 | 0.0 |
|  | Production of prepreg |  | Method (δ) | Method (δ) | Method (δ) | Method (δ) | — | — |
| Evaluation of component (C) | Melting point or glass transition temperature | (° C.) | 124 (melting point) | 124 (melting point) | 102 (melting point) | 102 (melting point) | — | — |
|  | Average particle diameter | (μm) | 27 | 27 | 52 | 52 | — | — |
| Molding condition | Curing temperature | (° C.) | 125 | 125 | 125 | 125 | 125 | 125 |
| Evaluation of composite material | Plurality of component (C) regions are formed by components (C) being fused to each other |  | ○ | ○ | ○ | ○ | — | — |
|  | Uneven distribution rate | (%) | 71 | 83 | 74 | 79 | — | — |
|  | Average area of agglomerates derived from component (C) | (μm²) | 1455 | 1709 | 809 | 1270 | — | — |
|  | Glass transition temperature | (° C.) | 118 | 117 | — | — | 120 | 118 |
|  | $G_{Ic}$ (mode I interlaminar fracture toughness) | (kJ/m²) | 2.0 | 2.8 | 2.1 | 3.9 | 0.3 | 0.7 |
|  | $G_{IIc}$ (mode II interlaminar fracture toughness) | (kJ/m²) | 2.5 | 3.0 | 2.5 | 3.1 | 1.2 | 0.8 |
|  | Remark |  | — | — | — | — | Not containing component (C) | Not containing component (C) |

|  |  |  | Comparative Example 3 | Comparative Example 4 | Comparative Example 5 |
|---|---|---|---|---|---|
|  | Component (A) | TR50S | Used | Used | Used |
| Component (B) | Epoxy resin | jER828 | 39.5 | 39.5 | 39.5 |
|  |  | jER1001 | 42.4 | 42.4 | 42.4 |
|  |  | jER1002 | 0 | 0 | 0 |
|  |  | TSR-400 | 18.1 | 18.1 | 18.1 |
|  | Dicyandiamide | DICY15 | 5.2 | 5.2 | 5.2 |
|  | Urea compound | DCMU99 | 0 | 0 | 0 |
|  |  | OMICURE 94 | 1.4 | 1.4 | 1.4 |
|  | Arbitrary component | VINYLEC E | 0 | 0 | 0 |
|  |  | M52N | 5.4 | 5.4 | 5.4 |
| Component (C) |  | CT100 | 0 | 0 | 0 |
|  |  | 730-P1 | 0 | 0 | 0 |
|  |  | 750-P1 | 0 | 0 | 0 |
| Thermoplastic resin particles other than component (C) |  | Orgasol 3501 | 13.6 | 0 | 0 |
|  |  | Vestosint 2158 | 0 | 13.6 | 13.6 |
| Content of component (C) with respect to 100 parts by mass of component (B) |  | (parts by mass) | 0.0 | 0.0 | 0.0 |
| Prepreg | FAW of prepreg | (g/m²) | 150 | 150 | 150 |
|  | Content of resin in prepreg (component (C) is also calculated as part of matrix resin) | (wt %) | 37.5 | 37.5 | 37.5 |
|  | Content of resin particles in prepreg | (g/m2) | 0.0 | 0.0 | 0.0 |
|  | Production of prepreg |  | Method (δ) | Method (δ) | Method (δ) |
| Evaluation of component (C) | Melting point or glass transition temperature | (° C.) | 142 (melting point) | 177 (melting point) | 177 (melting point) |
|  | Average particle diameter | (μm) | 8 | 21 | 21 |
| Molding condition | Curing temperature | (° C.) | 125 | 125 | 180 |
| Evaluation of composite material | Plurality of component (C) regions are formed by components (C) being fused to each other |  | X | X | X |
|  | Uneven distribution rate | (%) | — | — | — |
|  | Average area of agglomerates derived from component (C) | (μm²) | 57 | 145 | 121 |
|  | Glass transition temperature | (° C.) | 121 | 119 | 116 |
|  | $G_{Ic}$ (mode I interlaminar fracture toughness) | (kJ/m²) | 0.2 | 0.5 | 0.7 |

TABLE 1-continued

| | | | | |
|---|---|---|---|---|
| $G_{IIc}$ (mode II interlaminar fracture toughness) | (kJ/m²) | 1.5 | 2.1 | 2.3 |
| Remark | | Melting point of resin particles being higher than curing temperature | Melting point of resin particles being higher than curing temperature | Matrix resin being cured before temperature reaches melting point because of low-temperature curing agent |

All of the fiber-reinforced composite materials of Examples 1 to 4 which contain the constituent element (C) and in which 60% by mass or more of all of the constituent elements (C) exist between layers of the constituent element (A) and 60% by mass or more of all of the constituent elements (C) exist in a state where two or more constituent elements (C) are fused to each other were excellent in mode I interlaminar fracture toughness and mode II interlaminar fracture toughness. On the other hand, all of the fiber-reinforced composite materials of Comparative Examples 1 and 2 not containing the constituent element (C) were inferior in mode I interlaminar fracture toughness and mode II interlaminar fracture toughness.

FIG. 1 is a microscope photograph of the cross-section of a molded plate for evaluation of Example 4.

In the photograph, a gathering of small white points are cross-sections of fibers constituting the constituent element (A), gray parts between layers of the constituent element (A) containing a matrix resin are interlaminar regions, and parts having dark gray interfaces in the interlaminar regions are fused regions formed by the constituent elements (C). In FIG. 1, parts having dark gray interfaces extend continuously and enlongatedly between layers containing the constituent element (A), and according to this, it was possible to confirm that the constituent elements (C) are thermally deformed and are sufficiently fused to form fused regions formed from the constituent elements (C).

INDUSTRIAL APPLICABILITY

The fiber-reinforced composite material obtained by the method for producing a fiber-reinforced composite material of the invention is excellent in mode I interlaminar fracture toughness and mode II interlaminar fracture toughness, and thus is useful as sports and leisure applications, automobile applications, other general industrial applications (expansive materials) and the like including aircraft applications.

The invention claimed is:

1. A single prepreg comprising the following constituent elements (A), (B), and (C), the constituent element (C) being present in a surface layer of the prepreg:
   Constituent element (A): a reinforcing fiber base material;
   Constituent element (B): an epoxy resin composition containing a curing agent, the epoxy resin composition having a cure temperature within the range of from 90° C. to 140° C. (inclusive); and
   Constituent element (C): particles of a thermoplastic resin having a melting point within the range of from 90° C. to 140° C. (inclusive),
   wherein 60% to 80% by mass of the constituent element (C) is present in the surface layer of the prepreg,
   wherein the cure temperature of Constituent element (B) is higher than the melting temperature of Constituent element (C).

2. The prepreg according to claim 1, wherein an average area Sa obtained by the following test method is 500 µm² or more:
   <Test Method>
   1. The prepreg is cut into a size of 300 mm x 200 mm and 20 sheets thereof are laminated to produce a prepreg laminate,
   2. A vacuum bag processing is performed by overlaying the prepreg laminate with a vacuum bag, the prepreg laminate is then heated using an autoclave to 80° C. at a temperature increase rate of 4° C/min, the state of 80° C. is maintained for 4 minutes, the prepreg laminate is further heated to 125° C. at a temperature increase rate of 4° C/min, and the state of 125° C. is maintained for 30 minutes, and during a period of extracting from heating start, a pressure in the autoclave is set to 0.6 MPa,
   3. The heated prepreg laminate is held in the autoclave until the temperature reaches 50° C. or lower at a temperature decrease rate of 3° C/min to produce a molded plate for evaluation,
   4. A 20 mm square test piece is cut from the molded plate for evaluation and the cross-section of the test piece is polished,
   5. A photograph of the cross-section of the test piece (500 magnifications) is taken using a digital microscope (manufactured by KEYENCE CORPORATION, VHX-5000),
   6. Next, areas of all of respective agglomerates derived from the constituent element (C) captured in the photograph are obtained using an area measurement tool of VHX-5000, and
   7. An average value of all the areas of the agglomerates derived from the constituent element (C) in the captured photograph is obtained as an average area Sa.

3. The prepreg according to claim 1, wherein an average particle diameter of the constituent element (C) is from 5 µm to 80 µm (inclusive).

4. The prepreg according to claim 1, wherein the constituent element (C) is particles of a polyamide resin.

5. The prepreg according to claim 1, wherein a content of the constituent element (C) with respect to 100 parts by mass of the constituent element (B) is from 10 parts by mass to 30 parts by mass (inclusive).

6. The prepreg according to claim 1 wherein the constituent element (B) contains another thermoplastic resin different from the thermoplastic resin constituting the constituent element (C).

7. The prepreg according to claim 6, wherein the another thermoplastic resin is at least one resin selected from the group consisting of polyether sulfone, a phenoxy resin, polyvinyl formal, and an acrylic block copolymer.

8. The prepreg according to claim 1, wherein the constituent element (B) contains an epoxy resin having an oxazolidone ring skeleton.

9. The prepreg according to claim 1, wherein the constituent element (A) is a carbon fiber base material.

10. A prepreg laminate being obtained by laminating two or more sheets of the prepreg according to claim 1.

11. A fiber-reinforced composite material comprising the following constituent elements (A), (B), and (C'),
- two or more layers A, which contains the following constituent element (A) and has the following constituent element (B) as a matrix resin, being present, the fiber-reinforced composite material having a layer of the constituent element (B) containing the following constituent element (C') between the layers A:
- Constituent element (A): a reinforcing fiber base material;
- Constituent element (B): an epoxy resin composition containing a curing agent, the epoxy resin composition having a cure temperature within the range of from 90° C. to 140° C. (inclusive); and
- Constituent element (C'): a thermoplastic resin having a melting point within the range of from 90° C. to 140° C. (inclusive),
- wherein 60% to 80% by mass of the constituent element (C') is present in the layer having constituent element (B),
- wherein the cure temperature of Constituent element (B) is higher than the melting temperature of Constituent element (C).

* * * * *